US010809711B2

(12) United States Patent
Lee et al.

(10) Patent No.: US 10,809,711 B2
(45) Date of Patent: Oct. 20, 2020

(54) ELECTRONIC DEVICE AND METHOD FOR CONTROLLING THE SAME

(71) Applicant: Samsung Electronics Co., Ltd., Gyeonggi-do (KR)

(72) Inventors: Young-Bae Lee, Gyeonggi-do (KR); Tae-Kyun Kim, Gyeonggi-do (KR); Seung-Nyun Kim, Incheon (KR)

(73) Assignee: Samsung Electronics Co., Ltd (KR)

( * ) Notice: Subject to any disclaimer, the term of this patent is extended or adjusted under 35 U.S.C. 154(b) by 449 days.

(21) Appl. No.: 15/863,418

(22) Filed: Jan. 5, 2018

(65) Prior Publication Data

US 2018/0188723 A1 Jul. 5, 2018

(30) Foreign Application Priority Data

Jan. 5, 2017 (KR) .......................... 10-2017-0001992

(51) Int. Cl.
*G05D 1/00* (2006.01)
*G05D 1/08* (2006.01)
(Continued)

(52) U.S. Cl.
CPC ......... *G05D 1/0016* (2013.01); *B64C 39/024* (2013.01); *G05D 1/0038* (2013.01);
(Continued)

(58) Field of Classification Search
CPC .. G05D 1/0016; G05D 1/0038; G05D 1/0094; G05D 1/0808; G05D 1/101;
(Continued)

(56) References Cited

U.S. PATENT DOCUMENTS 8,958,928 B2 2/2015 Seydoux et al.
9,513,629 B1 * 12/2016 Thorn ...................... G05D 1/12
(Continued)

FOREIGN PATENT DOCUMENTS

KR 1020150133536 11/2015
KR 10-1600699 2/2016
(Continued)

OTHER PUBLICATIONS

European Search Report dated Jun. 1, 2018 issued in counterpart application No. 18150444.0-1204, 7 pages.

*Primary Examiner* — Frederick M Brushaber
(74) *Attorney, Agent, or Firm* — The Farrell Law Firm, P.C.

(57) ABSTRACT

An electronic device is provided. The electronic device includes a user interface configured to receive a first direction input, a second direction input, a third direction input, and a fourth direction input, the first direction input used to move the electronic device horizontally in a left direction, the second direction input used to move the electronic device horizontally in a right direction, the third direction input used to move the electronic device vertically in an upper direction, and the fourth direction input used to move the electronic device vertically in a lower direction, a wireless communication circuit configured to establish a wireless communication channel with an unmanned aerial vehicle (UAV) including a camera, and a processor configured to control the UAV based on the directional inputs.

17 Claims, 22 Drawing Sheets

(51) Int. Cl.
*G05D 1/10* (2006.01)
*H04N 5/232* (2006.01)
*B64C 39/02* (2006.01)
*G06F 3/0488* (2013.01)
*H04W 76/10* (2018.01)

(52) U.S. Cl.
CPC ......... *G05D 1/0094* (2013.01); *G06F 3/0488* (2013.01); *H04N 5/23296* (2013.01); *B64C 2201/021* (2013.01); *B64C 2201/024* (2013.01); *B64C 2201/027* (2013.01); *B64C 2201/123* (2013.01); *B64C 2201/127* (2013.01); *B64C 2201/141* (2013.01); *B64C 2201/146* (2013.01); *H04W 76/10* (2018.02)

(58) Field of Classification Search
CPC .............. H04N 5/23296; B64C 39/024; B64C 2201/141; B64C 2201/021; B64C 2201/027; B64C 2201/123; B64C 2201/024; B64C 2201/127; B64C 2201/146; G06F 3/0488; H04W 76/10
See application file for complete search history.

(56) References Cited

U.S. PATENT DOCUMENTS

| 9,663,227 | B1* | 5/2017 | Lema ................... G05D 1/0016 |
| 9,739,870 | B1* | 8/2017 | Beckman .............. B64C 39/024 |
| 9,769,387 | B1* | 9/2017 | Beard ................... G06K 9/0063 |
| 10,005,555 | B2* | 6/2018 | Mishra ................... B64D 47/02 |
| 2015/0134143 | A1* | 5/2015 | Willenborg .......... G05D 1/0094 701/2 |
| 2016/0018822 | A1* | 1/2016 | Nevdahs ................. G05D 1/08 701/26 |
| 2016/0191793 | A1 | 6/2016 | Yang et al. |
| 2016/0327950 | A1 | 11/2016 | Bachrach et al. |
| 2017/0313416 | A1* | 11/2017 | Mishra ................... G05D 1/104 |
| 2018/0029706 | A1* | 2/2018 | Baruch ................. B64C 39/024 |
| 2018/0365995 | A1* | 12/2018 | Murray ................. B64C 39/022 |
| 2019/0061942 | A1* | 2/2019 | Miller ................. G05D 1/0088 |
| 2020/0195847 | A1* | 6/2020 | Zheng ................. G06K 9/0063 |
| 2020/0221005 | A1* | 7/2020 | Tao ........................ B64D 47/08 |

FOREIGN PATENT DOCUMENTS

| KR | 10-2016-0080253 | 7/2016 |
| WO | WO 2016/168722 | 10/2016 |

* cited by examiner

ELECTRONIC DEVICE AND METHOD FOR CONTROLLING THE SAME

PRIORITY

This application claims priority under 35 U.S.C. § 119(a) to Korean Patent Application Serial No. 10-2017-0001992, which was filed in the Korean Intellectual Property Office on Jan. 5, 2017, the entire disclosure of which is incorporated herein by reference.

BACKGROUND

1. Field of the Disclosure

The present disclosure relates, generally, to electronic devices and methods for controlling the same, and more particularly, to electronic devices and methods for intuitively controlling unmanned aerial vehicles (UAVs).

2. Description of the Related Art

UAVs which are capable of taking images are known. UAVs, although initially intended for military or surveillance purposes, are being developed for other various purposes, e.g., product delivery or photography. A camera-equipped UAV may transmit captured images to an external device, e.g., a smartphone, through wireless communication so that the user may view images displayed on the external device.

A user may control the flight of a UAV using an external controller (e.g., a remote controller or smartphone). However, the user may have difficulty in position-controlling the UAV using the external device. For example, it may be difficult for the user to position the UAV when taking selfies. Failure to smoothly control the UAV renders it difficult for the user to obtain their desired images, and may result in the UAV colliding with various obstacles (including other UAVs), thus damaging the UAV.

SUMMARY

The present disclosure has been made to address at least the disadvantages described above and to provide at least the advantages described below. Accordingly, an aspect of the present disclosure allows a user to intuitively control a UAV.

In accordance with an aspect of the present disclosure, there is provided an electronic device. The electronic device includes a user interface configured to receive a first direction input, a second direction input, a third direction input, and a fourth direction input, the first direction input used to move the electronic device horizontally in a left direction, the second direction input used to move the electronic device horizontally in a right direction, the third direction input used to move the electronic device vertically in an upper direction, and the fourth direction input used to move the electronic device vertically in a lower direction, a wireless communication circuit configured to establish a wireless communication channel with an unmanned aerial vehicle (UAV) including a camera, a processor electrically connected with a memory, the user interface, and the wireless communication circuit, and configured to receive a user input to select a first mode, during the first mode, transmit a first control signal to move the UAV in the left direction while a distance between the UAV and the electronic device is maintained in response to receiving the first direction input, transmit a second control signal to move the UAV in the right direction while the distance between the UAV and the electronic device is maintained in response to receiving the second direction input, transmit a third control signal to move the UAV in the upper direction while the distance between the UAV and the electronic device is maintained in response to receiving the third direction input, and transmit a fourth control signal to move the UAV in the lower direction while the distance between the UAV and the electronic device is maintained in response to receiving the fourth direction input.

In accordance with an aspect of the present disclosure, there is provided an electronic device. The electronic device includes a communication circuit, a user interface, and a processor configured to receive a first input, generate a first control signal to move an unmanned aerial vehicle (UAV) in a direction corresponding to the first input while a distance between the UAV and the electronic device is maintained according to the first input, and transmit the first control signal to the UAV.

In accordance with an aspect of the present disclosure, there is provided an electronic device. The electronic device includes a communication circuit, a user interface, and a processor configured to receive a first input based on a first coordinate system, generate, using the first input, a second coordinate system and a first control signal to move an unmanned aerial vehicle (UAV) with a distance between the UAV and the electronic device being maintained, and transmit the first control signal to the UAV.

BRIEF DESCRIPTION OF THE DRAWINGS

The above and other aspects, features and advantages of certain embodiments of the present disclosure will be more apparent from the following detailed description taken in conjunction with the accompanying drawings, in which.

Throughout the drawings, like reference numerals will be understood to refer to like parts, components, and structures.

DETAILED DESCRIPTION

Figure 1:
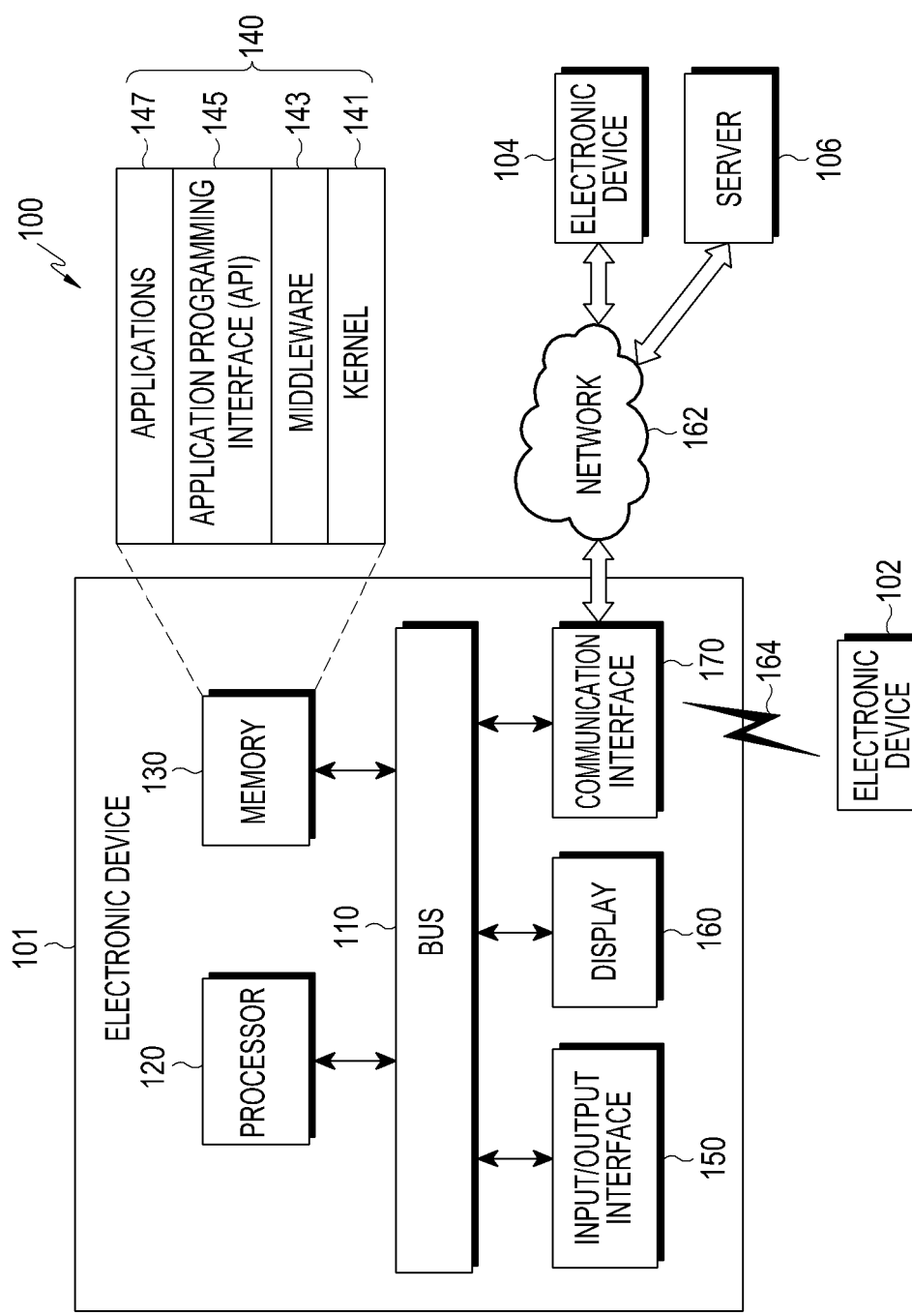
FIG. 1 is a diagram of a plurality of electronic devices, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

An electronic device according to the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of Things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

A control device for controlling one of the aforementioned electronic devices can include at least one button in the form of an arrow indicating one of left, right, up, or down. For example, the control device may include a left button, a right button, an up button, and a down button. The control device may include a first left button, a first right button, a first up button, a first down button, a second left button, a second right button, a second up button, and a second down button. In a first control mode, an input to the first left button may be set as an input to turn the UAV counterclockwise while maintaining the distance between the UAV and the control device. An input to the first right button may be set as an input to turn the UAV clockwise while maintaining the distance between the UAV and the control device. An input to the first up button may be set as an input to move the UAV away from the control device while maintaining the distance between the UAV and the control device and while maintaining the angle between the ground and the line connecting the UAV with the original point, as viewed from the control device. An input to the first down button may be set as an input to move the UAV close to the control device while maintaining the distance between the UAV and the control device and while maintaining the angle between the ground and the line connecting the UAV with the original point, as viewed from the control device. An input to the second left button may be set as an input to move the UAV to the left while maintaining the distance between the UAV and the control device, as viewed from the control device. An input to the second right button may be set as an input to move the UAV to the right while maintaining the distance between the UAV and the control device, as viewed from the control device. An input to the second up button may be set as an input to move the UAV upwards while maintaining the distance between the UAV and the control device, as viewed from the control device. An input to the second down button may be set as an input to move the UAV downwards while maintaining the distance between the UAV and the control device, as viewed from the control device.

In a second control mode, an input to the first left button may be set as an input to turn the UAV counterclockwise while maintaining the distance between the UAV and the control device. An input to the first right button may be set as an input to turn the UAV clockwise while maintaining the distance between the UAV and the control device. An input to the first up button may be set as an input to move the UAV upwards while maintaining the distance between the UAV and the control device, as viewed from the control device. An input to the first down button may be set as an input to move the UAV downwards while maintaining the distance between the UAV and the control device, as viewed from the control device. An input to the second left button may be set as an input to move the UAV to the left while maintaining the distance between the UAV and the control device, as viewed from the control device. An input to the second right button may be set as an input to move the UAV to the right while maintaining the distance between the UAV and the control device, as viewed from the control device. An input to the second up button may be set as an input to move the UAV upwards while maintaining the distance between the UAV and the control device, as viewed from the control device. An input to the second down button may be set as an input to move the UAV close to the control device while maintaining the distance between the UAV and the control device and while maintaining the angle between the ground and the line connecting the UAV with the original point, as viewed from the control device.

A third control mode, a fourth control mode, or another mode may be a mode set so that at least one input described above corresponds to each button.

Hereinafter, it is assumed that the control mode of the control device is the second control mode.

Hereinafter, an electronic device will be described with reference to the accompanying drawings. In the present disclosure, the term "user" may indicate a person using an electronic device or a device (e.g., an artificial intelligence electronic device) using an electronic device.

Referring to FIG. 1, an electronic device 101 is included in a network environment 101. The electronic device 101 includes a bus 110, a processor 120, a memory 130, an input/output interface 150, a display 160, and a communication interface 170. The electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor, or a communication processor (CP). The processor 120 may perform control on at least one of the other components of the electronic device 101 or perform an operation or data processing relating to communication.

The memory 130 may include a volatile and/or non-volatile memory. The memory 130 may store commands or data related to at least one other component of, e.g., the electronic device 101. The memory 130 may store software and/or a program 140. The program 140 may include, e.g., a kernel 141, middleware 143, an application programming interface (API) 145, and/or an application program (or application) 147. At least a portion of the kernel 141, middleware 143, or API 145 may be denoted an operating system (OS). The kernel 141 may control or manage system resources (e.g., the bus 110, processor 120, or a memory 130) used to perform operations or functions implemented in other programs (e.g., the middleware 143, API 145, or application 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141. Further, the middleware 143 may process one or more task requests received from the application 147 in order of priority. The middleware 143 may assign a priority of using system resources (e.g., bus 110, processor 120, or memory 130) of the electronic device 101 to at least one of the applications 147 and process one or more task requests. The API 145 is an interface allowing the application 147 to control functions provided from the kernel 141 or the middleware 143. The API 133 may include at least one interface or function (e.g., a command) for filing control, window control, image processing or text control. The input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display various contents (e.g., text, images, videos, icons, and/or symbols) to the user. The display 160 may include a touchscreen and may receive, e.g., a touch, gesture, proximity or hovering input using an electronic pen or a body portion of the user. The communication interface 170 may set up communication between the electronic device 101 and a first electronic device 102, a second electronic device 104, or a server 106. The communication interface 170 may be connected with the network 162 through wireless communication 164 or wired communication to communicate with the second external electronic device 104 or server 106.

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (Wi-Bro), or global system for mobile communication (GSM). The wireless communication may include at least one of, e.g., wireless fidelity (Wi-Fi), Bluetooth (BT), BT low power (BLE), zigbee, near field communication (NFC), magnetic secure transmission (MST), radio frequency, or body area network (BAN). The wireless communication may include global navigation satellite system (GNSS). The GNSS may be, e.g., global positioning system (GPS), global navigation satellite system (Glonass), Beidou navigation satellite system (Beidou) or Galileo, or the European global satellite-based navigation system. Hereinafter, the terms GPS and the GNSS may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. All or some of operations executed on the electronic device 101 may be executed on electronic devices 102 and 104 or server 106. When the electronic device 101 performs some function or service automatically or at a request, the electronic device 101, instead of executing the function or service on its own or additionally, may request the electronic devices 102 and 104 or server 106 to perform at least some functions associated therewith. The electronic devices 102 and 104 or server 106 may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used.

Figure 2:
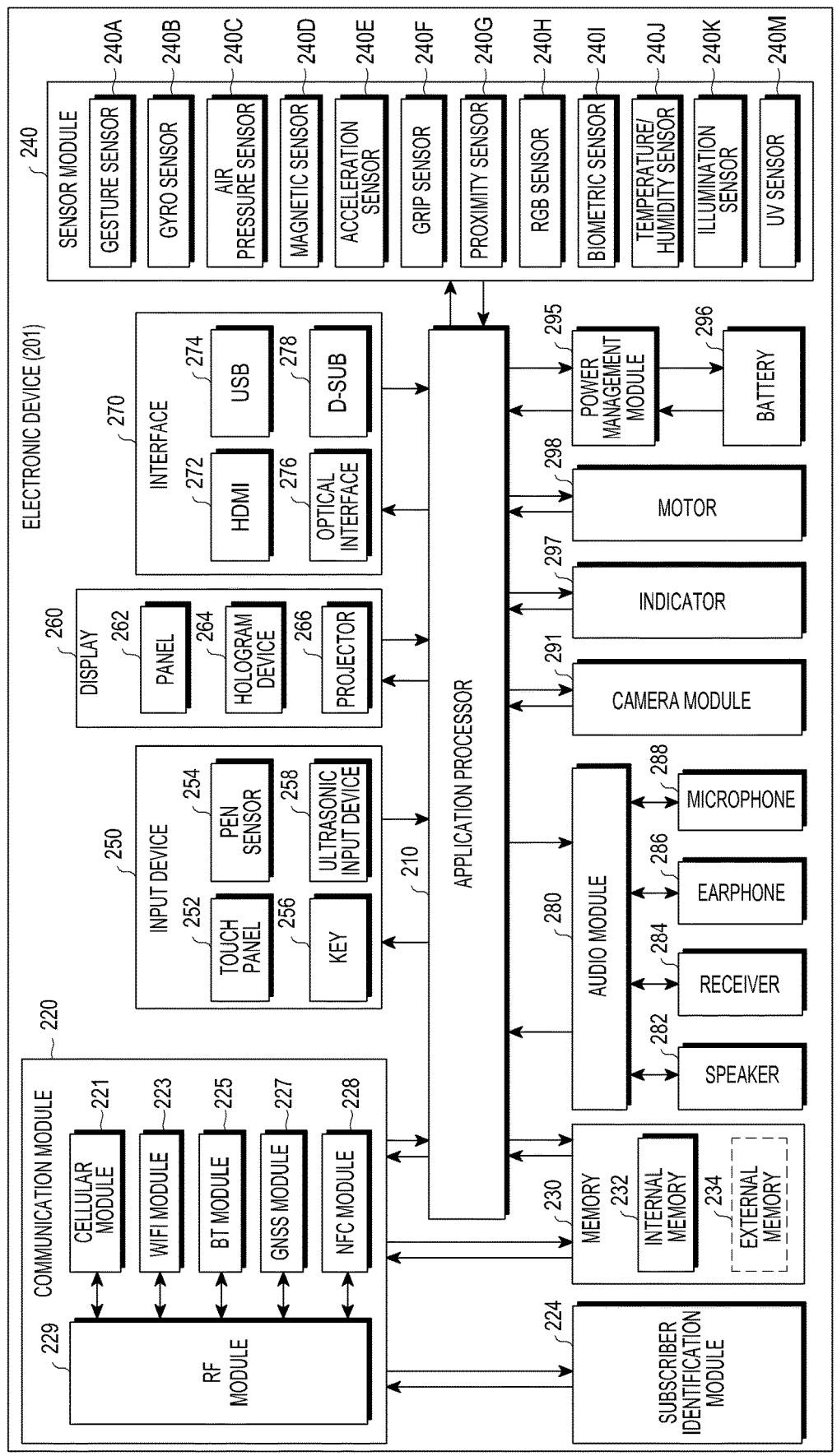
FIG. 2 is a diagram of an electronic device, according to an embodiment of the present disclosure.

FIG. 2 is a diagram of an electronic device 201, according to an embodiment of the present disclosure. The electronic device 201 may include the whole or part of, e.g., the electronic device 101 of FIG. 1. The electronic device 201 may include one or more processors (e.g., application processors) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an OS or applications, and the processor 210 may process and compute various data. The processor 210 may be implemented in a system on chip (SoC). The processor 210 may further include a graphic processing unit (GPU) and/or an image signal processor. The processor 210 may include at least some (e.g., a cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface of FIG. 1. The communication module 220 may include the cellular module 221, a Wi-Fi module 223, a BT module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using the SIM 224. The cellular module 221 may perform at least some of the functions providable by the processor 210. The cellular module 221 may include a CP. At least some (e.g., two or more) of the cellular module 221, the Wi-Fi module 223, the BT module 225, the GNSS module 227, or the NFC module 228 may be included in a single integrated circuit (IC) or an IC package. The RF module 229 may transmit and receive radio frequency (RF) signals. The RF module 229 may include a transceiver, a power amp module (PAM), a frequency filter, a low noise amplifier (LNA), or an antenna. At least one of the cellular module 221, the Wi-Fi module 223, the BT module 225, the GNSS module 227, or the NFC module 228 may communicate RF signals through a separate RF module. The SIM 224 may be a card or an embedded SIM, and may contain unique identification information (e.g., an integrated circuit card identifier (ICCID) or subscriber information (e.g., an international mobile subscriber identity (IMSI)).

The memory 230 may include an internal memory 232 or an external memory 234. The internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid-state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

The sensor module 240 may measure a physical quantity or detect a motion state of the electronic device 201, and the sensor module 240 may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB)) sensor, a bio sensor 240I, a temperature/humidity sensor 240J, an illumination sensor 240K, or an ultra violet (UV) sensor 240M. Additionally or alternatively, the sensing module 240 may include an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. The electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include a part of a touch panel or a separate sheet for recognition. The key 256 may include a physical button, optical key or key pad. The ultrasonic input device 258 may sense an ultrasonic wave generated from an input tool through a microphone 288 to identify data corresponding to the sensed ultrasonic wave.

The display 260 may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. The panel 262 may include a pressure sensor (or force sensor) that may measure the strength of a pressure by the user's touch. The pressure sensor may be implemented in a single body with the touch panel 252 or may be implemented in one or more sensors separate from the touch panel 252. The hologram device 264 may make three-dimensional (3D) images (holograms) in the air by using light interference. The projector 266 may display an image by projecting light onto a screen. The screen may be located inside or outside of the electronic device 201. The interface 270 may include e.g., a high definition multimedia interface (HDMI) 272, a USB 274, an optical interface 276, or a d-subminiature (D-sub) 278. The interface 270 may be included in the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound signal into an electrical signal and vice versa. At least a part of the audio module 280 may be included in the input/output interface 145 as shown in FIG. 1. The audio module 280 may process sound information input or output through a speaker 282, a receiver 284, an earphone 286, or the microphone 288. The camera module 291 may be a device for capturing still images and videos, and may include one or more image sensors (e.g., front and back sensors), a lens, an image signal processor (ISP), or a flash such as an LED or xenon lamp. The power manager module 295 may manage power of the electronic device 201. The power manager module 295 may include a power management Integrated circuit (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery and/or a solar battery.

The indicator 297 may indicate a particular state of the electronic device 201 or a part (e.g., the processor 210) of the electronic device, including a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per digital multimedia broadcasting (DMB), digital video broadcasting (DVB), or MediaFlo™ standards. Each of the aforementioned components of the electronic device 201 may include one or more parts, and a name of the part may vary with a type of the electronic device 201. The electronic device 201 may exclude some elements or include more elements, or some of the elements may be combined into a single entity that may perform the same function as by the elements before combined.

Figure 3:
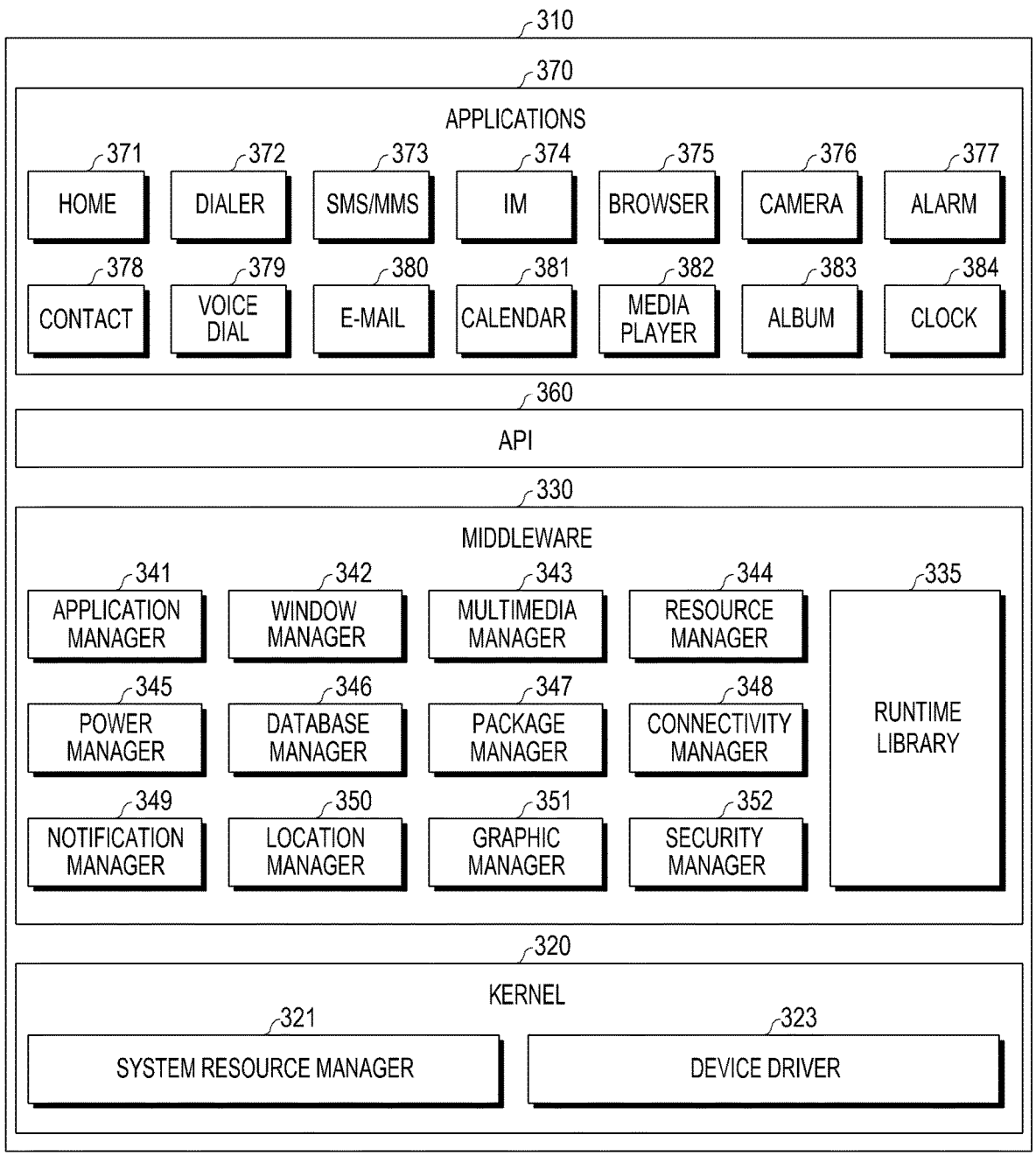
FIG. 3 is a diagram of a program module, according to an embodiment of the present disclosure.

FIG. 3 is a diagram illustrating a program module, according to an embodiment of the present disclosure. The program module 310 may include an OS controlling resources related to the electronic device 101 and/or various applications 147 driven on the OS. The OS may include, e.g., Android™, iOS™, Windows™, Symbian™, Tizen™, or Bada™. The program module 310 may include a kernel 320, middleware 330, an API 360, and/or an application 370. At least a part of the program module 310 may be preloaded on the electronic device or may be downloaded from an external electronic device.

The kernel 320 may include, e.g., a system resource manager 321 or a device driver 323. The system resource manager 321 may perform control, allocation, or recovery of system resources. The system resource manager 321 may include a process managing unit, a memory managing unit, or a file system managing unit. The device driver 323 may include a display driver, a camera driver, a BT driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module used by a compiler in order to add a new function through a programming language while the application 370 is being executed. The runtime library 335 may perform input/output management, memory management, or arithmetic function processing. The application manager 341 may manage the life cycle of the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage the battery capability or power and provide power information necessary for the operation of the electronic device. The power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage wireless connectivity. The notification manager 349 may provide an event, e.g., arrival message, appointment, or proximity alert, to the user. The location manager 350 may manage locational information on the electronic device. The graphic manager 351 may manage graphic effects to be offered to the user and their related user interface. The security manager 352 may provide system security or user authentication. The middleware 330 may include a telephony manager for managing the voice or video call function of the electronic device or a middleware module able to form a combination of the functions of the above-described elements. The middleware 330 may provide a module specified according to the type of the OS. The middleware 330 may dynamically omit some existing components or add new components.

The API 360 may be a set of API programming functions and may have different configurations depending on operating systems. In the case of Android™ or iOS™, one API set may be provided per platform, and in the case of Tizen™, two or more API sets may be offered per platform.

The application 370 may include an application that may provide a home application 371, a dialer application 372, an SMS/MMS 373 application, an instant message (IM) application 374, a browser application 375, a camera application 376, an alarm application 377, a contact application 378, a voice dial application 379, an email application 380, a calendar application 381, a media player application 382, an album application 383, a clock application 384, and/or a health-care (e.g., measuring the degree of workout or blood glucose), or provision of environmental information (e.g., provision of air pressure, moisture, or temperature information). The application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. The notification relay application may transfer notification information generated by other application of the electronic device to the external electronic device or receive notification information from the external electronic device and provide the received notification information to the user. The device management application may install, delete, or update a function (e.g., turn-on/turn-off the external electronic device (or some elements) or adjusting the brightness (or resolution) of the display) of the external electronic device communicating with the electronic device or an application operating on the external electronic device. The application 370 may include an application (e.g., a health-care application of a mobile medical device) designated according to an attribute of the external electronic device. The application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
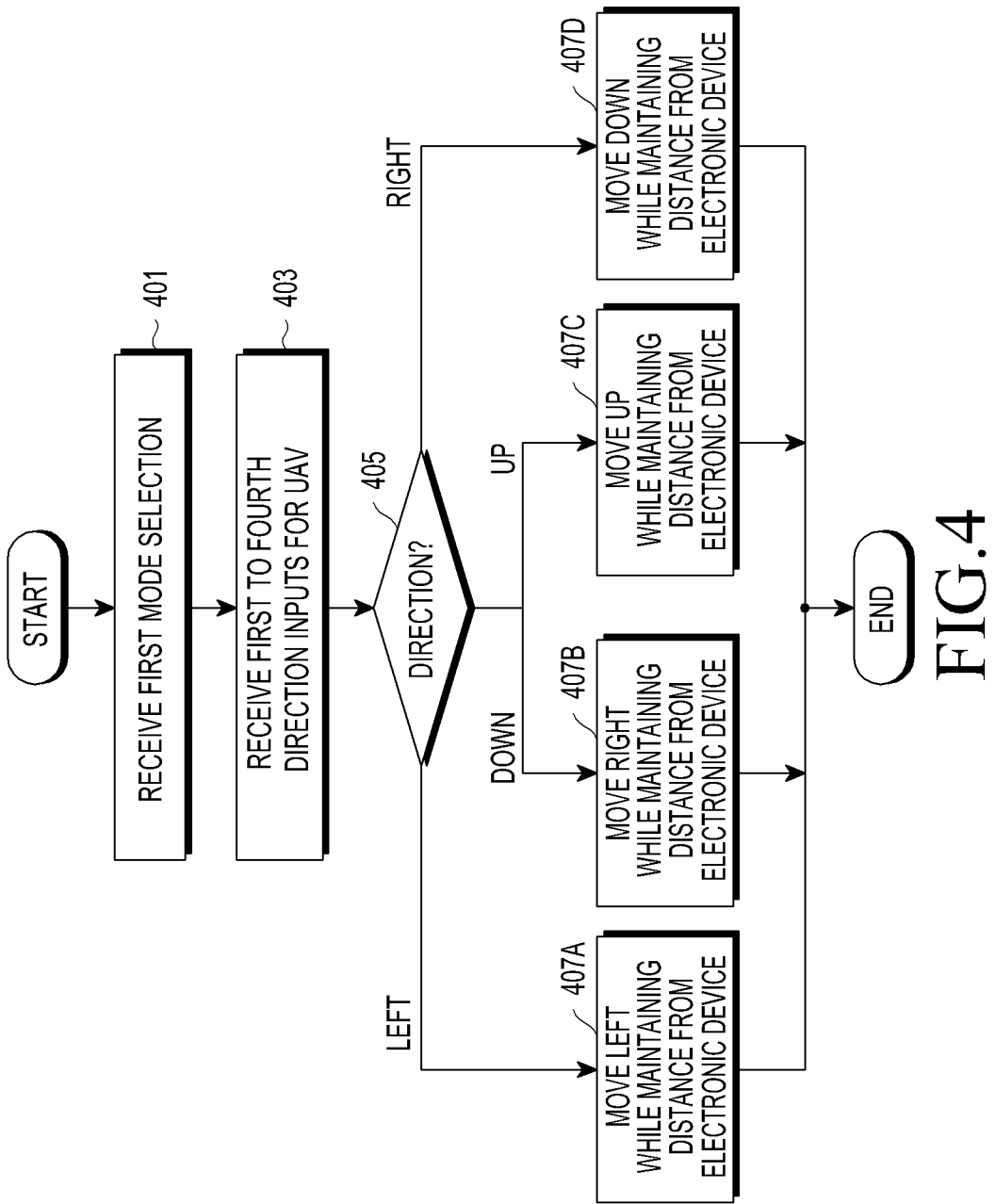
FIG. 4 is a flowchart of a method for controlling an electronic device, according to an embodiment of the present disclosure.

FIG. 4 is a flowchart of a method for controlling an electronic device, according to an embodiment of the present disclosure.

Referring to FIG. 4, an electronic device 101 may receive a selection of a first mode in step 401.

For example, a processor 120 of the electronic device may receive a selection of the first mode using a user interface. The user interface may be an input/output interface 150 or a display 160.

The first mode may include a spherical coordinate system input mode for a UAV. A second mode may include a cylindrical coordinate system input mode for a UAV. A third mode may include a rectangular coordinate system input mode for a UAV.

When the first mode is selected, the processor 120 may execute a spherical coordinate system input mode. The processor 120 may display a plurality of input interfaces corresponding to the spherical coordinate system input mode using the user interface. The processor 120 may display a plurality of direction handles corresponding to the spherical coordinate system input mode using the user interface. The processor 120 may display a plurality of direction sticks corresponding to the spherical coordinate system input mode using the user interface. The processor 120 may display a plurality of direction buttons corresponding to the spherical coordinate system input mode using the user interface.

The processor 120 may obtain a first direction input for a UAV through the spherical coordinate system input interface displayed on the user interface. The first direction input may include an input to horizontally move to the left, and the processor 120 may obtain a second direction input for a UAV through the spherical coordinate system input interface displayed on the user interface. The second direction input may include an input to horizontally move to the right. The processor 120 may obtain a third direction input for a UAV through the spherical coordinate system input interface displayed on the user interface, and the third direction input may include an input to vertically move up. The processor 120 may obtain a fourth direction input for a UAV through the spherical coordinate system input interface displayed on the user interface, and the fourth direction input may include an input to vertically move down.

The processor 120 may receive the first to fourth direction inputs for the UAV in step 403.

The processor 120 may determine the direction of a received input in step 405.

In step 407A, when the direction of the received input is for an input to horizontally move to the left, the processor 120 may transmit a first control signal to enable the UAV to move to the left as viewed from the electronic device 101 (with the distance between the electronic device 101 and the UAV maintained) to the UAV through a communication channel.

In step 407B, when the direction of the received input is for an input to horizontally move to the right, the processor 120 may transmit a second control signal to enable the UAV to move to the right as viewed from the electronic device 101 (with the distance between the electronic device 101 and the UAV maintained) to the UAV through a communication channel.

In step 407C, when the direction of the received input is for an input to vertically move upwards, the processor 120 may transmit a third control signal to enable the UAV to move upwards as viewed from the electronic device 101 (with the distance between the electronic device 101 and the UAV maintained) to the UAV through a communication channel.

In step 407D, when the direction of the received input is one for an input to vertically move downwards, the processor 120 may transmit a fourth control signal to enable the UAV to move downwards as viewed from the electronic device 101 (with the distance between the electronic device 101 and the UAV maintained) to the UAV through a communication channel.

Figure 5A:
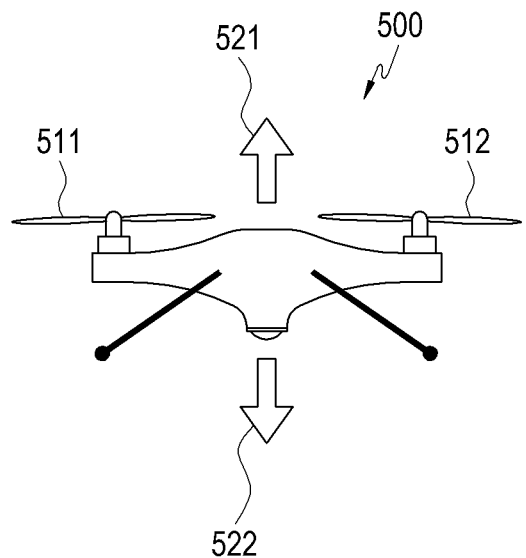
FIGS. 5A and 5B are diagrams of a method for controlling a UAV, according to an embodiment of the present disclosure.
Figure 5B:
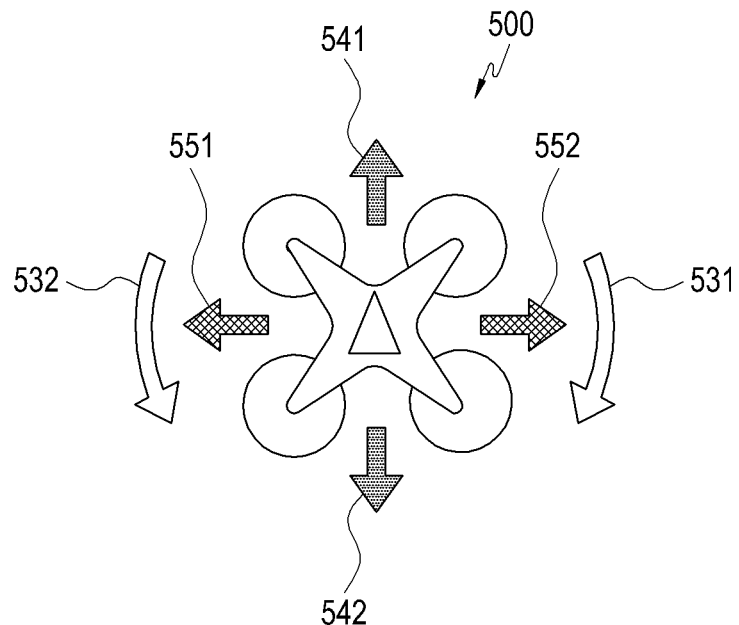

FIGS. 5A and 5B are diagrams of a method for controlling a UAV, according to an embodiment of the present disclosure.

The UAV is controlled through four independent inputs, which generally include the throttle, roll, pitch, and yaw control inputs. Throttle is defined as a ratio (%) relative to the maximum thrust. For rotorcrafts, an increase in thrust causes a lift in altitude. Thus, throttle can be defined as a control input in the altitude direction. In particular, a UAV capable of automatic altitude control receives values for altitude ascending and descending ratios as inputs, is fed back values from an altitude sensor, and controls its thrust on its own by the feedback controller therein. Roll, pitch, and yaw can be defined as turns around the body axes X, Y, and Z, respectively, of the UAV. For rotorcraft UAVs, roll or pitch movement causes the thrust line to be inclined. Thus, a roll input and a pitch input, respectively, can be defined as inputs to move to the left and right or to the front and back. Likewise for throttle, a UAV capable of automatic position control receives left/right or front/back coordinates as inputs, is fed back with position values using a position sensor, such as a GPS or optical flow sensor (OFS), and controls angles for roll and pitch through its internal feedback controller. Yaw turn can be defined as a control input for the UAV heading, i.e., the direction that UAV faces.

In sum, throttle, roll, pitch, and yaw can be received as inputs for manual flight, and altitude, left/right, front/back, and heading can be used as four inputs for automated flight. The four control inputs cannot independently be exchanged from each other. Throttle and altitude, roll and left/right, pitch and front/back, or yaw and heading may interchangeably be used per input dependently from each other based on manual/automated flight.

As shown in FIG. 5A, a UAV 500 may include one or more rotatable rotors 511 and 512. For example, the UAV 500 may receive control signals from an external electronic device (e.g., camera 291) and turn the plurality of rotors 511 and 512 based on control signals. For example, upon receiving a control signal to vertically move upwards, the UAV 500 may increase the revolutions per hour (rph) of the plurality of rotors 511 and 512 to lift the UAV 500. Upon receiving a control signal to vertically move downwards, the UAV 500 may decrease the revolutions per hour (rph) of the plurality of rotors 511 and 512 to lower the UAV 500.

As shown in FIG. 5B, the UAV 500 may turn counterclockwise 532 or clockwise 531. For example, upon receiving a signal to turn clockwise from the electronic device 101, the UAV 500 may turn clockwise 531, while being positioned stationary, based on the control signal. Upon receiving a signal to turn counterclockwise from the electronic device 101, the UAV 500 may turn counterclockwise 532, while being positioned stationary, based on the control signal.

When the UAV 500 is a multicopter, the UAV 500 may receive a control signal to horizontally move in a first direction 541 from the electronic device 101. The UAV 500 may receive a control signal to horizontally move in an opposite direction 542 of the first direction from the electronic device 101. The UAV 500 may receive a control signal to horizontally move in a second direction 551 from the electronic device 101. The UAV 500 may receive a control signal to horizontally move in an opposite direction 552 of the second direction from the electronic device 101.

Figure 6:
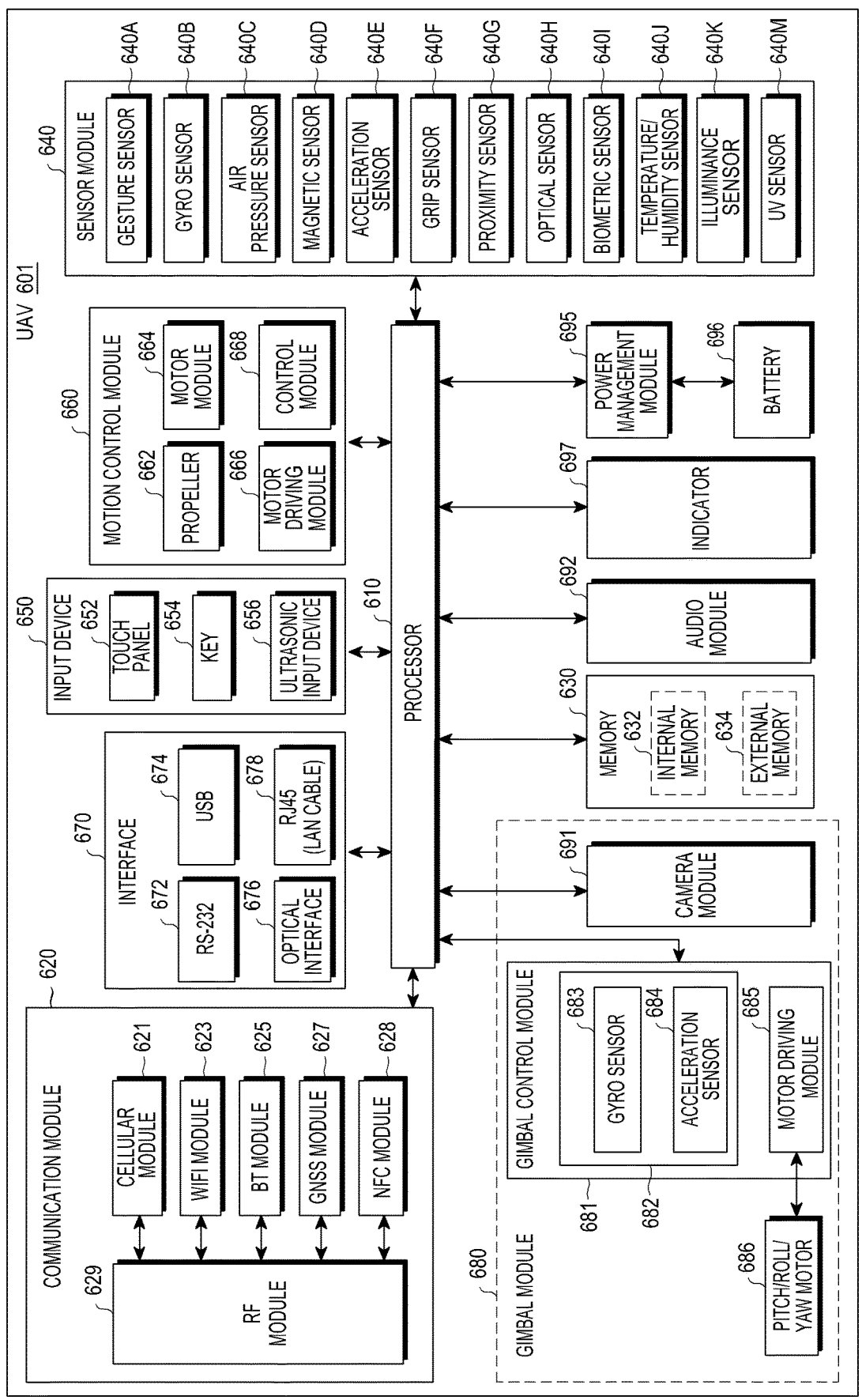
FIG. 6 is a diagram of an electronic device, according to an embodiment of the present disclosure.

FIG. 6 is a diagram of a UAV, according to an embodiment of the present disclosure.

Referring to FIG. 6, a UAV 601 may further include one or more processors 610 (e.g., access points (APs)), a communication module 620 (or a wired/wireless communication circuit), an interface 670, an input device 650, a sensor module 640, a memory 630, an audio module 692, an indicator 697, a power management module 695, a battery 696, a camera module 691, and a motion control module 660. The electronic device 201 may further include a gimbal module 680.

The processor 610 may control multiple hardware and software components connected to the processor 610 by running an OS or application programs, and the processor 210 may process and compute various data. The processor 610 may drive an OS or an application program to generate a flight command for the UAV 601. The processor 610 may generate a motion control signal (or motion command) using data received from the camera module 691, the sensor module 640, or the communication module 620.

The processor 610 may generate a motion control signal by calculating a relative distance of an object obtained. The processor 210 may generate an altitude control signal for the UAV 601 based on a vertical coordinate (or a vertical azimuth) of the object and a horizontal and direction (or azimuth) control signal for the UAV 601 based on a horizontal coordinate (or a horizontal azimuth) of the object.

The communication module 620 may include a cellular module 621, a Wi-Fi module 623, a BT module 625, a GNSS module 627, an NFC module 628, and a RF module 629. The communication module 620 may receive control signals for the UAV 601 and transmit state information about the UAV 601 and image data to other UAVs. The RF module 629 may transmit and receive RF signals). The RF module 629 may include at least one of, e.g., a transceiver, a PAM, a frequency filter, a LNA, or an antenna. The GNSS module 627 may output location information indicating at least one of the latitude, longitude, altitude, speed, and heading information about the UAV 601. The location of the UAV 601, or the location information about the UAV 601, may be computed by measuring an exact time and distance through the GNSS module 627. The GNSS module 627 may obtain an exact time and 3D speed information, as well as the location with the latitude, longitude, and altitude. The UAV 601 may transmit information for identifying the real-time movement of the UAV 601 through the communication module 620 to another UAV.

The interface 670 may be a device for data input/output with another UAV. The interface 670 may transfer commands or data input from another external electronic device to other component(s) of the UAV 601 or may output commands or data received from other component(s) of the UAV 601 to the user or other UAVs, using a USB 674, an optical interface 676, RS-232 672, or RJ45 678 interface.

The input device 650 may include, e.g., a touch panel 652, a key 656, or an ultrasonic input device 658. The touch panel 652 may use at least one of capacitive, resistive, infrared, or ultrasonic methods. The touch panel 652 may further include a control circuit. The key 656 may include a physical button, optical key or key pad. The ultrasonic input device 658 may sense an ultrasonic wave generated from an input tool through a microphone to identify data corresponding to the sensed ultrasonic wave. Control inputs for the UAV 601 may be received through the input device. For example, when a physical power key is pressed, the UAV 601 may be powered off.

The sensor module 640 may include all or some of a gesture sensor 640A capable of detecting the motion and/or gesture of an object, a gyro sensor 640B capable of measuring the angular speed of the flying UAV 601, an air pressure sensor (e.g., a barometer) 640C capable of measuring the atmospheric pressure and/or a variation in the atmospheric pressure, a magnetic sensor 640D (e.g., a terrestrial magnetism sensor or compass sensor) capable of measuring the terrestrial magnetism, an acceleration sensor 640E capable of measuring the acceleration of the flying UAV, a grip sensor 640F, a proximity sensor 640G capable of measuring the proximity or distance of an object (including an ultrasonic sensor capable of outputting an ultrasound wave and obtaining a reflection of the ultrasound wave on an object to thereby measuring the distance), an optical sensor 640H (e.g., an optical flow sensor (OFS)) capable of recognizing the topography or pattern of a floor to produce the location, a biometric sensor 640I for user authentication, a temperature/humidity sensor 640J capable of measuring the temperature and humidity, an illuminance sensor 640K capable of measuring illuminance, and a UV sensor 640M capable of measuring the intensity of UV rays. The sensor module 640 may calculate the posture of the UAV 601, and the posture information about the UAV 601 may be shared with the motion control module 660.

The memory 630 may include an internal memory 632 and an external memory 634. The memory 630 may store commands or data related to at least one other component of the UAV 601. The memory 630 may store software and/or a program. The program may include a kernel, middleware, an API, and/or an application program (or an application).

The audio module 692 may convert a sound signal into an electrical signal and vice versa. The audio module 292 may include a speaker and a microphone to process sound inputs or outputs.

The indicator 697 may indicate a particular state of the UAV 601 or a part (e.g., the processor) of the UAV, including an operation state or recharging state. The indicator 697 may also indicate the state of flight and operation mode of the UAV 601.

The power manager module 695 may manage power of the UAV 601. The power manager module 695 may include a PMIC, a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery, a voltage, a current, or a temperature while the battery is being charged.

The battery 696 may include a rechargeable battery and/or a solar battery.

The communication module 691 may be included in the UAV 601 or in a gimbal module 680. The camera module 691 may include a lens, an image sensor, an image processor, and a camera controller. The camera controller may adjust the upper, lower, left, and right angles of the camera lens based on composition information and/or camera control information outputted form the processor 610, for adjusting the composition and/or camera angle (image capturing angle) with respect to the object. The image sensor may include a low driver, a pixel array, and a column driver. The image processor may include a pre-image processing unit, a post-image processing unit, a still image codec, and a video codec. The image processor may be included in the processor. The camera controller may control focusing and tracking.

The camera module 691 may perform an image capturing operation in an image capturing mode. The camera module 691 may be influenced by the motion of the UAV 601. The camera module 691 may be positioned in the gimbal module 680 to minimize image capturing variations in the camera module 691 due to the motion of the UAV 601.

The motion control module 660 may control the posture and motion of the UAV 601 using posture and position information about the UAV 601. The motion control module 660 may control the roll, pitch, yaw, and throttle (or altitude) of the UAV 601 according to the position and posture information obtained. The motion control module 660 may control the hovering flight operation and the free flight operation based on a free flight control signal provided from the processor 610 and the flight operation according to a user input command received (e.g., a distance movement, altitude movement, horizontal and direction (or azimuth) control signal). When the UAV 601 is a quadcopter, the motion control module 660 may include a plurality of control modules (e.g., microprocessor units (MPUs)) 668, a motor driving module 666, a motor module 664, and a propeller 662. The control module 668, the motor driving module 666, and the motor module 664 (or the motion control module 660 except for the propeller) may be provided with a driving circuit or navigation circuit configured to drive the propeller 662. The control module 668 may output control data to rotate the propeller 662 corresponding to the flight operation control. The motor driving module 666 may convert motor control data corresponding to the output of the control module 668 into a driving signal and output the driving signal. The motor module 664 may control the rotation of the corresponding propeller 662 based on a driving signal of the corresponding motor driving module 666.

The gimbal module 680 may include a gimbal control module 681, a sensor 682, a motor driving module 685, and a motor 686. The camera module 691 may be included in the gimbal module 680.

The gimbal module 680 may generate compensation data according to the motion of the UAV 601. The compensation data may be data for controlling at least part of the pitch, roll, or yaw of the camera module 691. The motor 686 (or a pitch motor, roller motor, and yaw motor) may compensate for the pitch, roll, and yaw of the camera module 691 according to the movement of the UAV 601. The camera module 691 may be mounted in the gimbal module 680 to cancel off the movement by the rotation (e.g., pitch rotation, roll rotation, and yaw rotation) of the UAV 601 (e.g., a multi-copter), for stabilizing the camera module 691 in a standing position. The gimbal module 680 may enable the camera module 691 to remain at a predetermined slope regardless of the motion of the UAV 601, allowing for stable image capturing. The gimbal control module 681 may include a sensor 682 including a gyro sensor 683 and an acceleration sensor 684. The gimbal control module 681 may analyze a measurement obtained by the sensor 682 including a gyro sensor 683 and an acceleration sensor 684, for generating a control signal through the motor driving module 685 and driving the motor 686 of the gimbal module 680.

Figure 7:
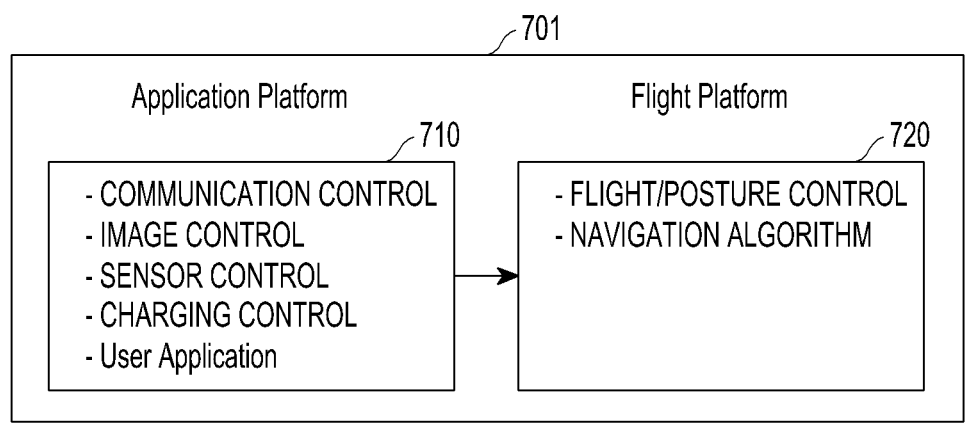
FIG. 7 is a diagram of a program module (e.g., a platform structure) of an electronic device, according to an embodiment of the present disclosure.

FIG. 7 is a diagram of a program module (e.g., a platform structure) of the UAV 601, according to an embodiment of the present disclosure.

As shown in FIG. 7, a program module 701 of the UAV 601 may include an application platform 710 and a flight platform 720. The UAV may include at least one or more of the application platform 710 for receiving a control signal from another UAV (e.g., a controller) wirelessly in interoperation to drive the UAV and to provide a service or the flight platform 720 for controlling the flight as per a navigation algorithm.

The application platform 710 may perform at least one of connectivity control, image control, sensor control, or charging control of the components of the UAV and varying the operation as per the user application. The application platform 710 may be executed on, the processor 610. The flight platform 720 may execute the flight, posture control, and navigation algorithm of the UAV.

The application platform 710 may deliver a control signal to the flight platform 720 while performing at least one of communication, image, sensor, and charging control.

The processor may obtain an image of an object through the camera module 691. The processor may analyze the obtained image and generate a control signal (or command) for controlling the flight of the UAV. The processor may generate size information and a motion state of the obtained object, and information about the relative distance, altitude, and azimuth between the image capturing device and object. The processor may generate a flight tracking (e.g., follow me mode) control signal of the UAV using the generated information. The flight platform 720 may control the motion control module based on the received control signal, flying the UAV (e.g., controlling the posture and motion of the UAV).

The GNSS module 627 and the sensor module 640 may measure at least one of the position, flight posture, posture angular speed, and acceleration of the UAV. The information outputted from the GPS module and the sensor module may become basic information about the control signal for navigation/automated control of the UAV. Information obtained from an air pressure sensor capable of measuring the altitude by a difference in atmospheric pressure by the flight of the UAV and ultrasonic sensors capable of accurate measurement at a lower altitude may also be utilized as the basic information. Besides, a control signal received from a remote controller, a control data signal, and battery status information about the UAV may also be utilized as the basic information about the control signal.

The UAV may fly using multiple propellers 662. Each propeller may convert a rotational force of the motor module 664 into a propelling force. Depending on the number of rotors (the number of propellers), the UAV may be a quadcopter when it has four rotors or propellers, a hexacopter when it has six rotors or propellers, or an octocopter when it has eight rotors or propellers.

The UAV may control the propellers based on received control signals. The UAV may fly based on two principles of lift and torque. The UAV may rotate a half of the multiple propellers clockwise (CW) and the other half counterclockwise (CCW). The UAV may fly tilted to the front or back/left or right. Tilting the UAV may change the direction of the air flow generated by the propellers (rotors). When the UAV tilts forwards, the air may be rendered to flow above and below the electronic device and slightly pushed away to the back. Thus, as the air layer is pushed to the back, the UAV may advance according to the action-reaction law. A method to tilt the UAV is to decelerate the rotors positioned in the front in the direction that the UAV advances while accelerating the rotors positioned in the back; this may apply for every direction. Thus, simply adjusting the speed of the motor module (rotors) may allow the UAV to tilt and move.

Among the various types of UAVs, a multi-copter is described herein. The UAV can be an aircraft designed to perform a designated duty with no pilot aboard. Such aircrafts may be classified largely into fixed wing types, e.g., airplanes, that are rendered to ascend by lift acting to airfoil wings and rotary wing types, e.g., helicopters, that are lifted up by thrust that is generated as rotors rotate. To float, rotary wing aircrafts basically require thrust that is more than its own weight. Thus, as compared with fixed wing aircrafts, rotary wing aircrafts suffer less efficiency and limitations in long-distance floating or flight. Nonetheless, rotary wing aircrafts are expanding their applications thanks to the capability of vertical take-off and landing (VTOL) and hovering. Among rotary wing UAVs, multi-copter UAVs that adopt multiple rotors are easy to control, carry, and operate, and are intensively being researched and quickly spreading. Such UAVs are commonly referred to as drones.

The UAV may receive a control signal generated by the application platform 710 from the flight platform 720 to control the motor module, thereby controlling the pitch (Y)/roll (X)/yaw (Z) or posture of the UAV and the flight of the UAV along the flight route.

Figure 8:
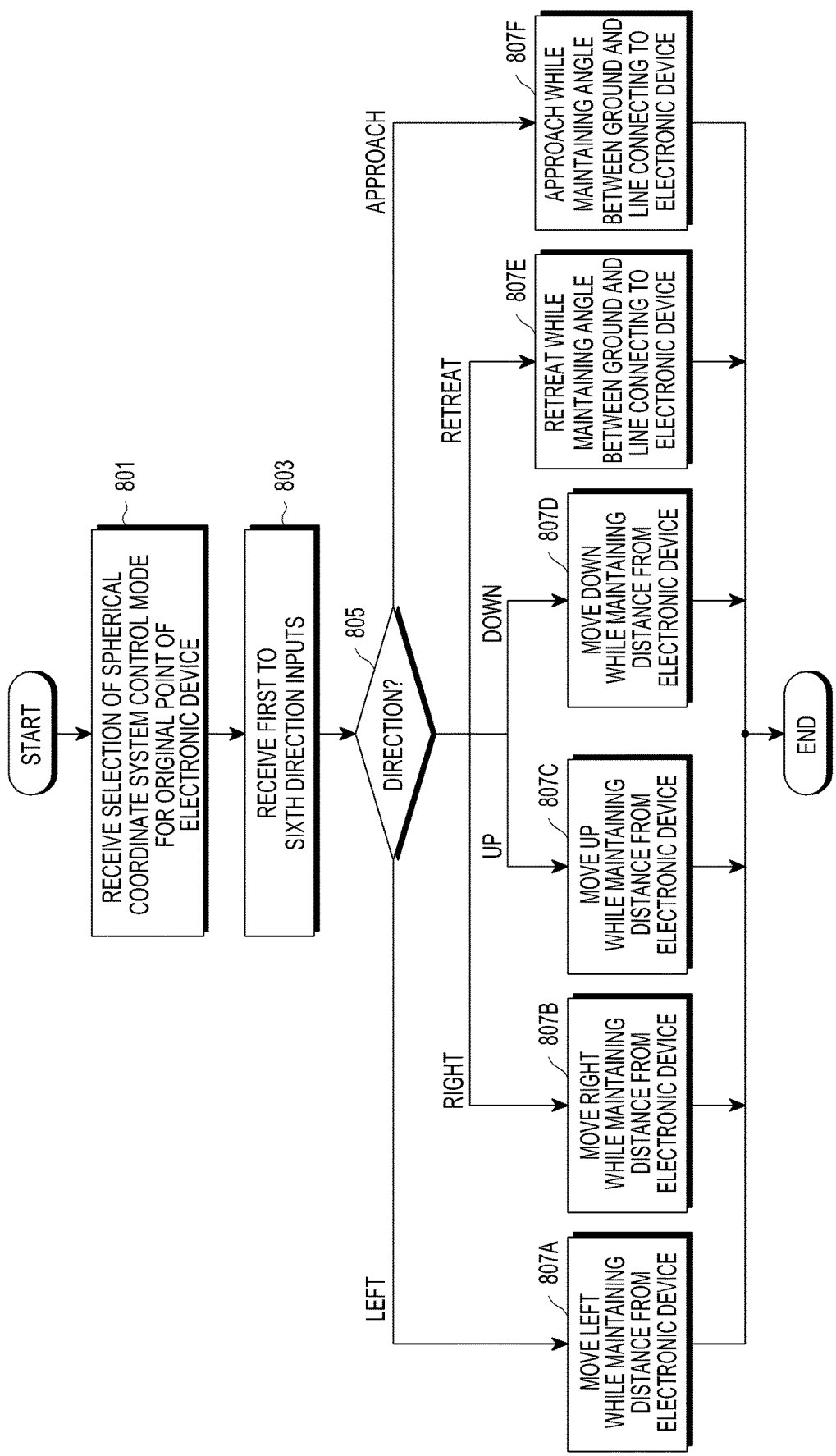
FIG. 8 is a flowchart of a method for controlling a UAV in a control mode of a spherical coordinate system, according to an embodiment of the present disclosure.

FIG. 8 is a flowchart of a method for controlling a UAV in a control mode of a spherical coordinate system, according to an embodiment of the present disclosure.

Referring to FIG. 8 the processor 120 may receive a selection for a spherical coordinate system control mode to set the electronic device 101 to the original point in step 801.

In the spherical coordinate system control mode, the processor 120 may set the original point according to a user's input or a preset scheme. The original point may be a particular point in a 3D space set by the electronic device or a user input.

In step 803, the processor 120 may receive at least one of a first direction input, a second direction input, a third direction input, a fourth direction input, a fifth direction input, or a sixth direction input using a user interface.

The first to fourth direction inputs may be the same as those described with reference to FIG. 4. The fifth direction input may include an input to move the UAV 601 away from the electronic device 101. The sixth direction input may include an input to move the UAV 601 close to the electronic device 101.

In step 805, the processor 120 may determine what direction the entered input is for. In step 807A, when the entered input includes an input to horizontally move to the left, the processor 120 may transmit, to the UAV 601, a move-left control signal to move the UAV 601 to the left as viewed from the electronic device 101 while the distance between the UAV 601 and the electronic device 101 is maintained.

In step 807B, when the entered input includes an input to horizontally move to the right, the processor 120 may transmit, to the UAV 601, a move-right control signal to move the UAV 601 to the right as viewed from the electronic device 101 while the distance between the UAV 601 and the electronic device 101 is maintained.

In step 807C, when the entered input includes an input to vertically move upwards, the processor 120 may transmit, to the UAV 601, a move-up control signal to move the UAV 601 upwards as viewed from the electronic device 101 while the distance between the UAV 601 and the electronic device 101 is maintained.

In step 807D, when the entered input includes an input to vertically move downwards, the processor 120 may transmit, to the UAV 601, a move-down control signal to move the UAV 601 downwards as viewed from the electronic device 101 while the distance between the UAV 601 and the electronic device 101 is maintained.

In step 807E, when the entered input includes an input to retreat, the processor 120 may transmit, to the UAV 601, a retreat control signal to move the UAV 601 away from the electronic device 101 as viewed from the electronic device 101 while the angle between the ground and the line connecting the UAV 601 with the electronic device 101 is maintained.

In step 807F, when the entered input includes an input to approach, the processor 120 may transmit, to the UAV 601, an approach control signal to move the UAV 601 close to the electronic device 101 as viewed from the electronic device 101 while the angle between the ground and the line connecting the UAV 601 with the electronic device 101 is maintained.

Figure 9:
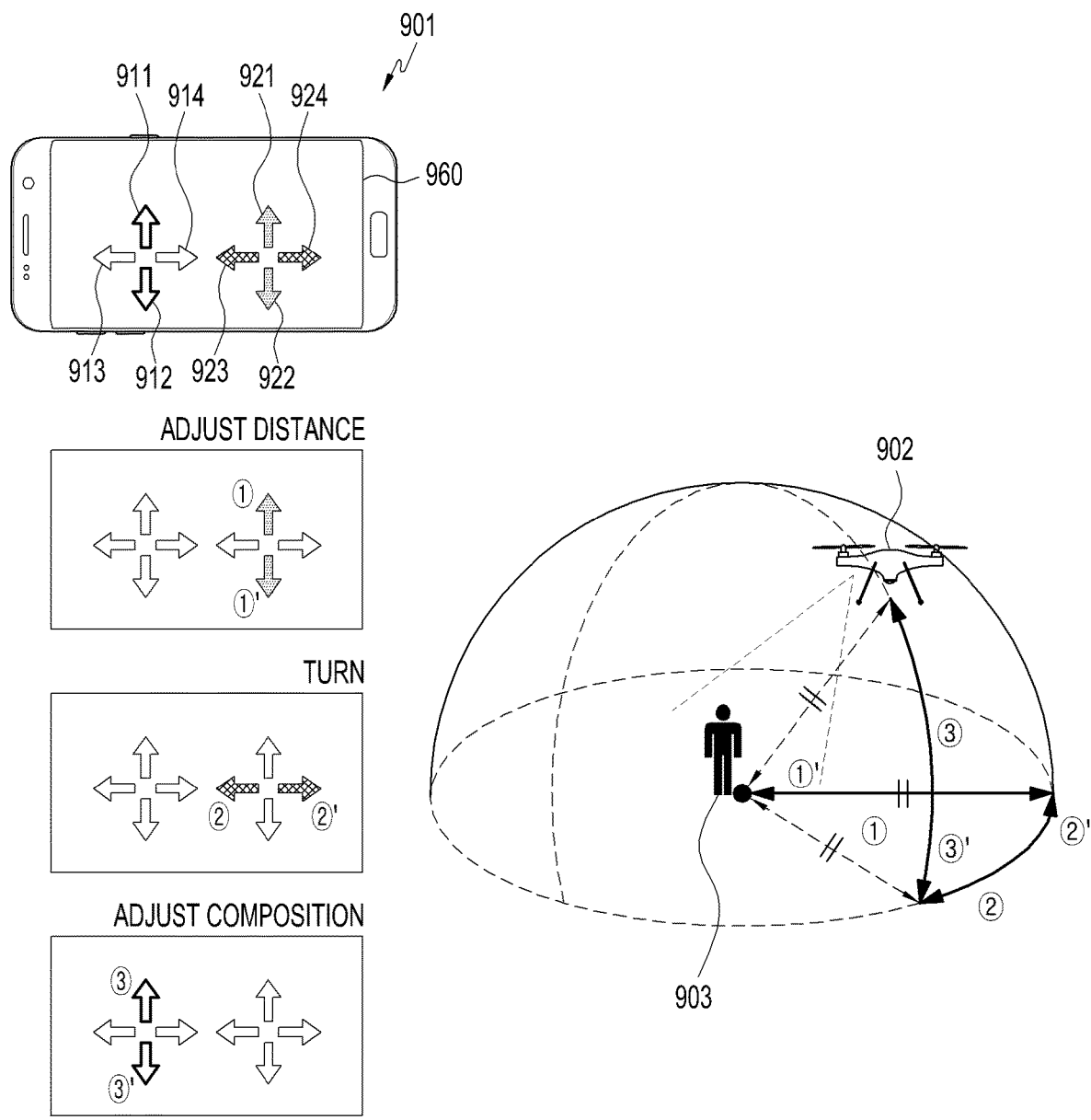
FIG. 9 is a diagram of a UAV and a method for controlling the UAV in a spherical coordinate system, according to an embodiment of the present disclosure.

FIG. 9 is diagram of a UAV and a method for controlling the UAV in a spherical coordinate system, according to an embodiment of the present disclosure.

Referring to FIG. 9, when using a second control mode among all scenarios encompassing the first to fourth control modes, upon receiving a selection of a spherical coordinate system control mode that sets the user as the original point through a user interface 960 (e.g., the display 160), the electronic device 901 may display a plurality of direction buttons set to receive a left turn input, a right turn input, a drift angle increasing direction input, a draft angle decreasing direction input, a retreat input, and an approach input for the UAV 902 on the user interface 960. A processor of the electronic device 901 may display, on the user interface 960, a left turn input button 923 set to receive a left turn input, may display, on the user interface 960, a right turn input button 924 set to receive a right turn input, may display, on the user interface 960, a drift angle increasing direction input button 911 set to receive a drift angle increasing direction input, may display, on the user interface 960, a drift angle decreasing direction input button 912 set to receive a drift angle decreasing direction input, may display, on the user interface 960, a retreat input button 921 set to receive a retreat input, and may display, on the user interface 960, an approach input button 922 set to receive an approach input.

The processor may display, on the user interface 960, a counterclockwise input button 913 set to receive a counterclockwise turn input for the UAV 902 and a clockwise input button 914 set to receive a clockwise turn input for the UAV 902.

When the left turn input button 923 ($\hat{2}$) is selected through the user interface 960, the processor may generate a left control signal to move the UAV 902 to the left as viewed from the original point 903 while the distance between the UAV 902 and the original point 903 is maintained, and the processor may transmit the generated left control signal to the UAV 902 via a communication channel established between the UAV 902 and the electronic device 901.

When the right turn input button 1024 ($\hat{2}'$) is selected through the user interface 960, the processor may generate a right control signal to move the UAV 902 to the right as viewed from the original point 903 while the distance between the UAV 902 and the original point 903 is maintained, and the processor may transmit the generated right control signal to the UAV 902 via the communication channel established between the UAV 902 and the electronic device 901.

When the drift angle increasing direction input button 911 ($\hat{3}$) is selected through the user interface 960, the processor may generate an up control signal to move the UAV 902 upwards as viewed from the original point 903 while the distance between the UAV 902 and the original point 903 is maintained, and the processor may transmit the generated up control signal to the UAV 902 via the communication channel established between the UAV 902 and the electronic device 901.

When the drift angle decreasing direction input button 912 ($\hat{3}'$) is selected through the user interface 960, the processor may generate a down control signal to move the UAV 902 downwards as viewed from the original point 903 while the distance between the UAV 902 and the original point 903 is maintained, and the processor may transmit the generated down control signal to the UAV 902 via the communication channel established between the UAV 902 and the electronic device 901.

When the retreat input button 921 ($\hat{1}$) is selected through the user interface 960, the processor may generate a retreat control signal to move the UAV 902 away from the original point 903 as viewed from the original point 903 while the angle between the ground and the line connecting the UAV 902 with the original point 903 is maintained, and the processor may transmit the generated retreat control signal to the UAV 902 via the communication channel established between the UAV 902 and the electronic device 901.

When the approach input button 922 (1̂') is selected through the user interface 960, the processor may generate an approach control signal to move the UAV 902 close to the original point 903 as viewed from the original point 903 while the angle between the ground and the line connecting the UAV 902 with the original point 903 is maintained, and the processor may transmit the generated approach control signal to the UAV 902 via the communication channel established between the UAV 902 and the electronic device 901.

All the controls processed by the input buttons 911, 912, 913, 914, 921, 922, 923, and 924 selected through the user interface 960 may be operated independently or simultaneously.

Four control inputs for the UAV 902 are defined in the spherical coordinate system of FIG. 9, and the four inputs include angle (composition) θ from the ground, turning angle φ around the original point, distance r from the original point, and azimuth Φ of the UAV 902. These four independent inputs may be received directly through a control device, an electronic device (e.g., a smartphone), or various external devices, e.g., a smartwatch, or applied using an internal sensor or other devices.

Figure 10:
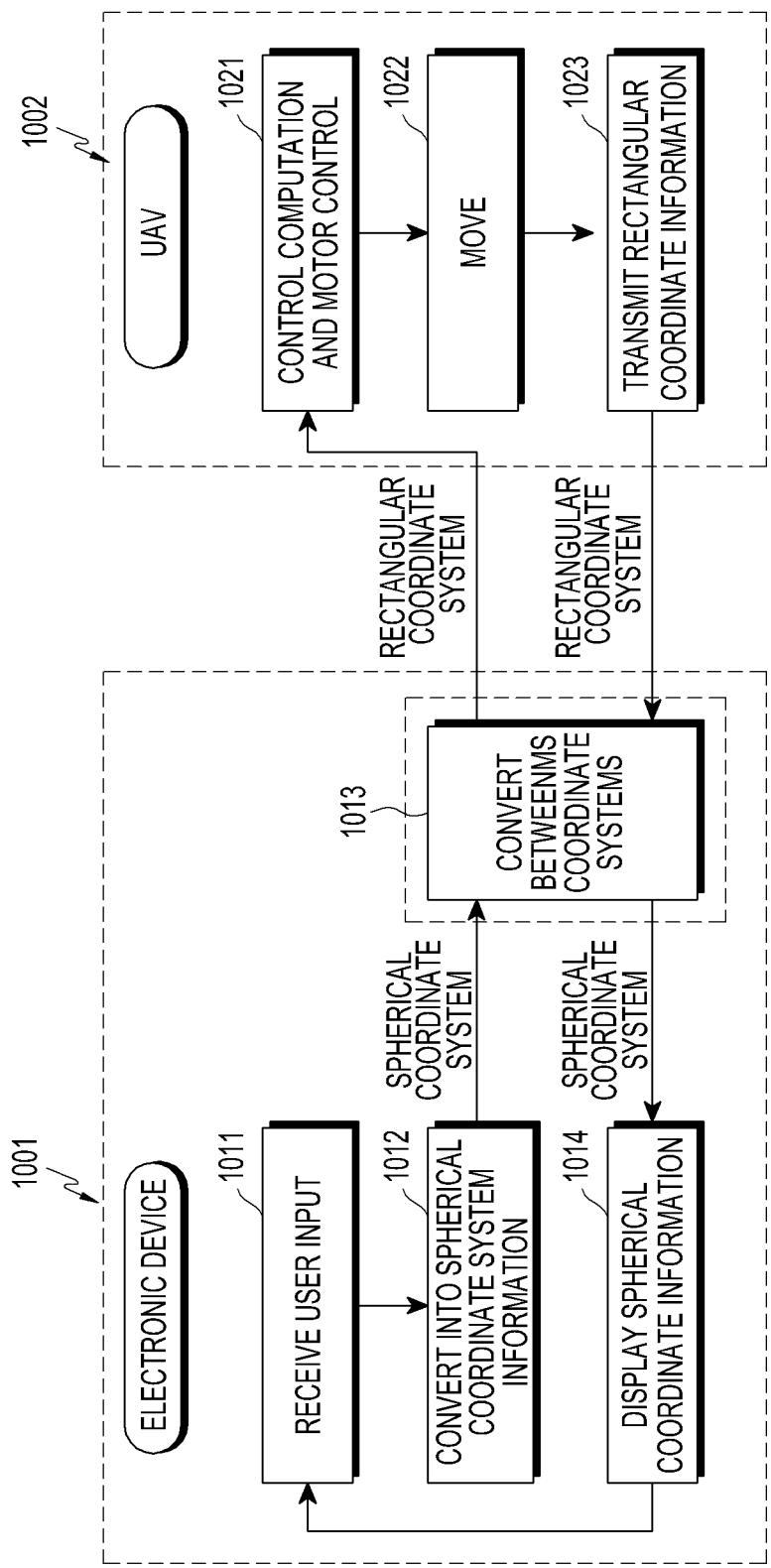
FIG. 10 is a diagram of a method for transferring information between an electronic device and a UAV, according to an embodiment of the present disclosure.

FIG. 10 is a diagram of a method for transferring information between an electronic device and a UAV, according to an embodiment of the present disclosure.

Referring to FIG. 10, an electronic device 1001 may receive (at step 1011) a user input (e.g., a touch input) or sensor value using a user interface 960. For example, a processor of the electronic device 1001 may receive, through the user interface 960, a left turn input (φ), a right turn input (φ), a drift angle increasing direction input (θ), a drift angle decreasing direction input (θ), a retreat input, or an approach input (r). The processor may receive a tilt input to tilt the electronic device 1001 in a particular direction using the user interface 960, and the processor may obtain a variation in acceleration of the acceleration sensor corresponding thereto.

The processor may convert (at step 1012) the received user input into spherical coordinate system information. Upon receiving a left turn input, the processor may generate, using the left turn input, a left control signal to enable the UAV 1002 to move to the left as viewed from the electronic device 1001 while the UAV 1002 remains at a distance from the electronic device 1001. Methods for generating a right control signal, an up control signal, a down control signal, a retreat control signal, and an approach control signal are the same as those described above in conjunction with the previously described drawings.

The processor may convert (at step 1013) each of the generated left control signal, right control signal, up control signal, down control signal, retreat control signal, or approach control signal into a movement control signal of a rectangular coordinate system. Similarly, the UAV 1002 may convert (at step 1013) each of the left control signal, right control signal, up control signal, down control signal, retreat control signal, or approach control signal, which is generated by the processor, into a movement control signal of a rectangular coordinate system.

The processor may convert the left control signal into an x-axis negative direction movement control signal to move the UAV 1002 in a preset negative direction on the x axis in a 3D space and a y-axis positive direction movement control signal to move the UAV 1002 in a preset positive direction on the y axis which is perpendicular to the x axis direction.

The processor may convert the right control signal into an x-axis positive direction movement control signal to move the UAV 1002 in a positive direction on the x axis in the 3D space and a y-axis negative direction movement control signal to move the UAV 1002 in a negative direction on the y axis.

The processor may convert the up control signal into an x-axis negative direction movement control signal to move the UAV 1002 in a negative direction on the x axis in the 3D space, a y-axis negative direction movement control signal to move the UAV 1002 in a negative direction on the y axis, and a z-axis positive direction movement control signal to move the UAV 1002 in a positive direction on the z axis which is perpendicular to the x axis and the y axis.

The processor may convert the down control signal into an x-axis positive direction movement control signal to move the UAV 1002 in a positive direction on the x axis in the 3D space, a y-axis positive direction movement control signal to move the UAV 1002 in a positive direction on the y axis, and a z-axis negative direction movement control signal to move the UAV 1002 in a negative direction on the z axis.

The processor may convert the retreat control signal into an x-axis positive direction movement control signal to move the UAV 1002 in a positive direction on the x axis in the 3D space, a y-axis positive direction movement control signal to move the UAV 1002 in a positive direction on the y axis, and a z-axis positive direction movement control signal to move the UAV 1002 in a positive direction on the z axis.

The processor may convert the approach control signal into an x-axis negative direction movement control signal to move the UAV 1002 in a negative direction on the x axis in the 3D space, a y-axis negative direction movement control signal to move the UAV 1002 in a negative direction on the y axis, and a z-axis negative direction movement control signal to move the UAV 1002 in a negative direction on the z axis.

The processor may transmit the movement control signal which has been converted as a signal of the spherical coordinate system through a communication channel to the UAV 1002.

The UAV 1002 may perform control computation and control (at step 1021) on at least one motor in the UAV 1002 based on the movement control signal.

The UAV 1002 may obtain a movement control distance along the x-axis positive direction based on the x-axis positive direction movement control signal. The UAV 1002 may tilt in the x-axis positive direction as per the x-axis positive direction movement control signal, and the UAV 1002 may travel (at step 1022) as long a distance as corresponds to the x-axis positive direction movement control signal in the x-axis positive direction, corresponding to the x-axis positive direction movement control signal.

The UAV 1002 may obtain a movement control distance along the z-axis positive direction based on the z-axis positive direction movement control signal. The UAV 1002 may increase the number of rotations of a plurality of rotors (e.g., the plurality of rotors 511 and 512) to move in the z-axis positive direction as per the z-axis positive direction movement control signal, and the UAV 1002 may travel (at step 1022) as long a distance as corresponds to the z-axis positive direction movement control signal in the z-axis positive direction, corresponding to the z-axis positive direction movement control signal.

The UAV 1002 may transmit (at step 1023) rectangular coordinate information corresponding to a result of the control (at step 1021) and travel (at step 1022) through a communication channel to the electronic device 1001. The rectangular coordinate information corresponding to the result may include information about at least one of an x coordinate, y coordinate, z coordinate, or azimuth of the UAV 1002.

The processor may convert (at step 1013) the transmitted rectangular coordinate information into spherical coordinate system spherical coordinate information, and the processor may display (at step 1014) the converted spherical coordinate information on the user interface 960.

The spherical coordinate information may include information about spherical coordinate system components, i.e., a distance r from the original point, turning angle $\varphi$ from a reference line, and angle $\theta$ between the ground and the line connecting the UAV 1002 with the original point, corresponding to the position of the UAV 1002 represented with the x, y, and z coordinates.

The spherical coordinate information may include the distance r between the electronic device 1001 (e.g., the original point) and the UAV 1002 and the angle $\theta$ at which the camera module of the UAV 1002 captures images. The processor may display the spherical coordinate information including the distance r between the electronic device 1001 (e.g., the original point) and the UAV 1002 and the angle $\theta$ of image capturing by the camera module of the UAV 1002 in the form of one of numbers, a graph, or a table.

As the spherical coordinate information is displayed, the electronic device 1001 may easily obtain the position information about the UAV 1002 based on the spherical coordinate system. The user may intuitively obtain exact information about the UAV 1002 through the electronic device 1001 and use the information in controlling the UAV 1002 or capturing images.

Figure 11:
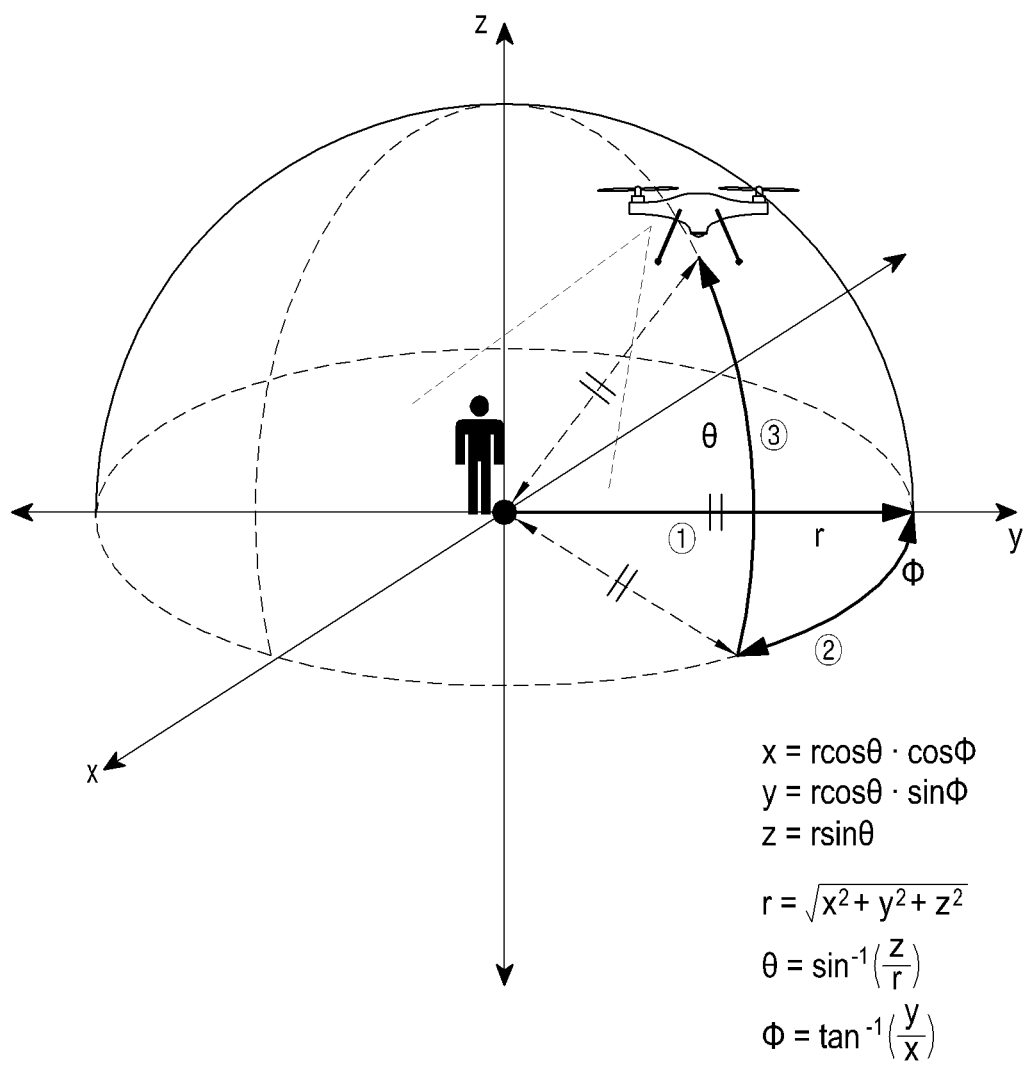
FIG. 11 is a diagram of a method for converting an input of a spherical coordinate system for controlling a UAV into a control signal of a rectangular coordinate system, according to an embodiment of the present disclosure.

FIG. 11 is a diagram of a method for converting an input of a spherical coordinate system for controlling a UAV into a control signal of a rectangular coordinate system, according to an embodiment of the present disclosure.

The UAV of FIG. 11 is configured to receive movement control signals based on the rectangular coordinate system.

As shown in FIG. 11, the x coordinate of the UAV may be represented as shown in Equation (1) below:

$$x = r^* \cos \theta^* \cos \varphi \quad (1)$$

The y coordinate of the UAV may be represented as shown in Equation (2) below:

$$y = r^* \cos \theta^* \sin \varphi \quad (2)$$

The z coordinate of the UAV may be represented as shown in Equation (3) below:

$$z = r^* \sin \theta \quad (3)$$

The r coordinate of the UAV may be represented as shown in Equation (4) below:

$$r = \sqrt{(x^2 + y^2 + z^2)} \quad (4)$$

The $\varphi$ coordinate of the UAV may be represented as shown in Equation (5) below:

$$\varphi = \tan^{-1} y/x \quad (5)$$

The $\theta$ coordinate of the UAV may be represented as shown in Equation (6) below:

$$\theta = \sin^{-1} z/r \quad (6)$$

Figure 12:
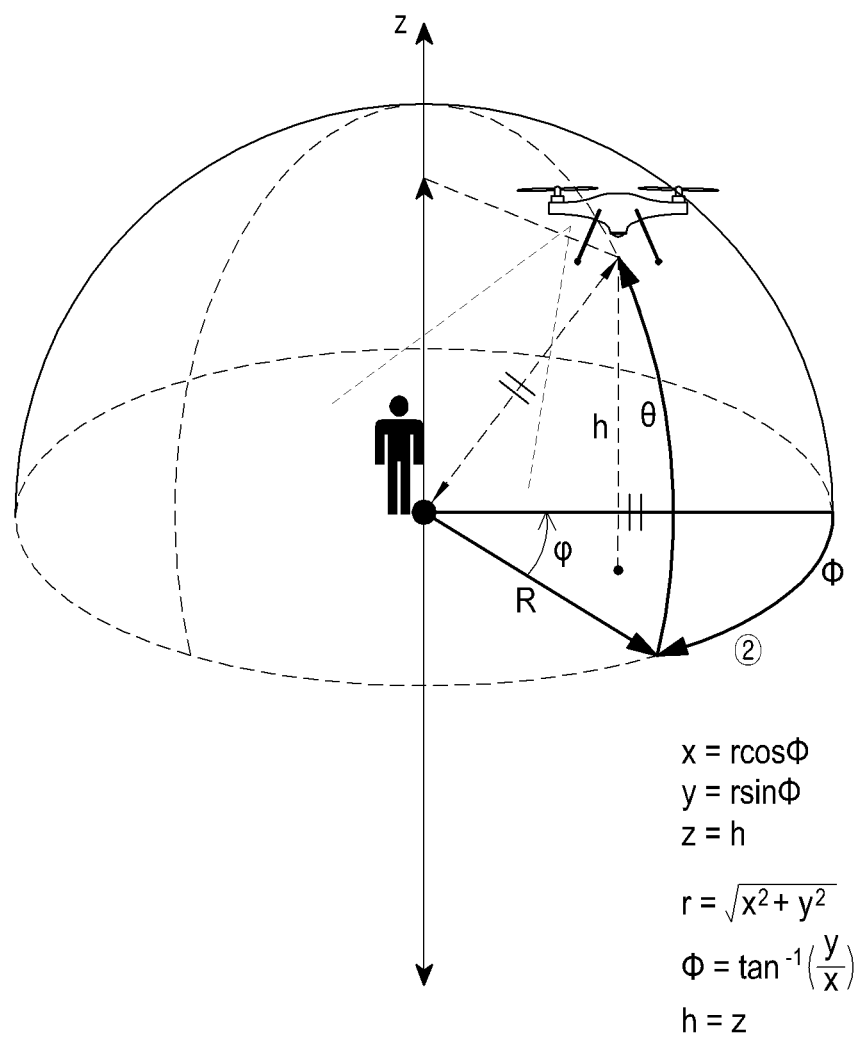
FIG. 12 is a diagram of a method for converting an input of a spherical coordinate system for controlling a UAV into a control signal of a cylindrical coordinate system, according to an embodiment of the present disclosure.

FIG. 12 is a diagram of a method for converting an input of a cylindrical coordinate system for controlling a UAV into a control signal of a rectangular coordinate system, according to an embodiment of the present disclosure.

The UAV of FIG. 12 is configured to receive movement control signals based on the cylindrical coordinate system.

As shown in FIG. 12, the x coordinate of the UAV may be represented as shown in Equation (7) below:

$$x = r^* \cos \varphi \quad (7)$$

The y coordinate of the UAV may be represented as shown in Equation (8) below:

$$y = r^* \sin \varphi \quad (8)$$

The z coordinate of the UAV may be represented as shown in Equation (9) below:

$$z = h \quad (9)$$

The r coordinate of the UAV may be represented as shown in Equation (10) below:

$$r = \sqrt{(x^2 + y^2)} \quad (10)$$

The y coordinate of the UAV may be represented as shown in Equation (11) below:

$$\varphi = \tan^{-1} y/x \quad (11)$$

The h coordinate of the UAV may be represented as shown in Equation (12) below:

$$h = z \quad (12)$$

Figure 13A:
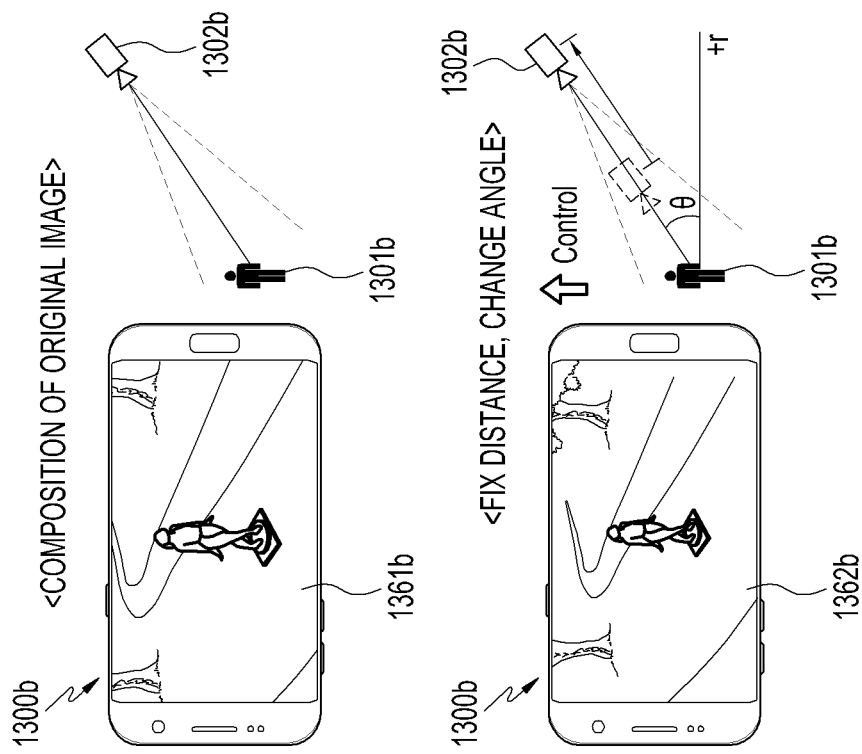
FIGS. 13A and 13B are diagrams of a method for separately changing each of the angle and distance between the ground and the line connecting a UAV with an electronic device, according to an embodiment of the present disclosure.
Figure 13B:
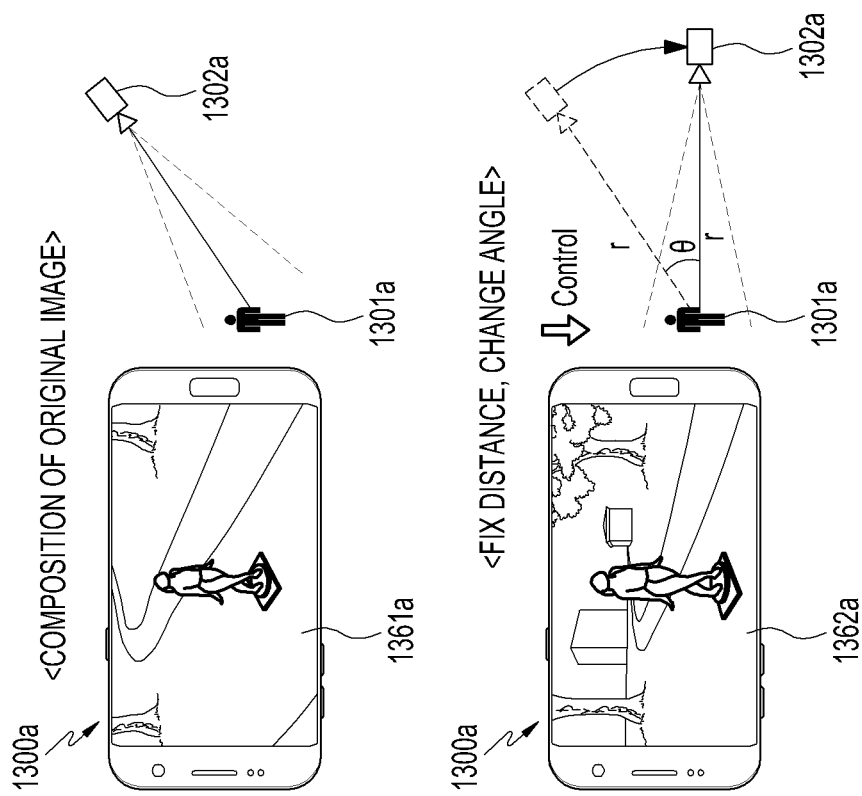

FIGS. 13A and 13B are diagrams of a method for separately changing each of the angle and distance between the ground and the line connecting a UAV with the original point, according to an embodiment of the present disclosure.

Referring to FIG. 13A, an electronic device 1300*a* may display a preview image for an object 1301*a* captured using a camera included in a UAV 1302*a* on a user interface 1361*a*.

The object 1301*a* may be set as the original point.

The user may apply a drift angle decreasing direction input to the electronic device 1300*a* when the user desires to change only the angle $\theta$ between the ground and the line connecting the object 1301*a* with the UAV 1302*a*, with the distance between the UAV 1302*a* and the object 1301*a* maintained. As the electronic device 1300*a* receives the drift angle decreasing direction input, the electronic device 1300*a* may generate a down control signal to move the UAV 1302*a* downwards as the UAV 1302*a* is viewed from the object 1301*a* to decrease (e.g., −$\theta$) the angle between the ground and the line connecting the UAV 1302*a* with the object 1301*a* while maintaining the distance r between the UAV 1302*a* and the object 1301*a*. The electronic device 1300*a* may convert the down control signal into a z-axis negative direction movement control signal, an x-axis positive direction control signal, and a y-axis negative direction control signal and transmit the signals through a communication channel to the UAV 1302*a*.

Referring to FIG. 13B, an electronic device 1300*b* may display a preview image for an object 1301*b* captured using a camera included in a UAV 1302*b* on a user interface 1361*b*.

The user may apply a retreat input to the electronic device 1300*b* when the user desires to change only the distance r between the object 1301*b* and the UAV 1302*b*, with the angle $\theta$ between the ground and the line connecting the UAV 1302*b* with the object 1301*b* maintained. As the electronic device 1300*b* receives the retreat input, the electronic device 1300*b* may generate a retreat control signal to move the UAV 1302*b* away from the object 1301*b* as the UAV 1302*b* is viewed from the object 1301*b* while the angle θ between the ground and the line connecting the UAV 1302*b* and the object 1301*b* is maintained. The electronic device 1300*b* may convert the retreat control signal into a z-axis positive direction movement control signal, an x-axis positive direction control signal, and a y-axis positive direction control signal and transmit the signals through a communication channel to the UAV 1302*b*.

Figure 14:
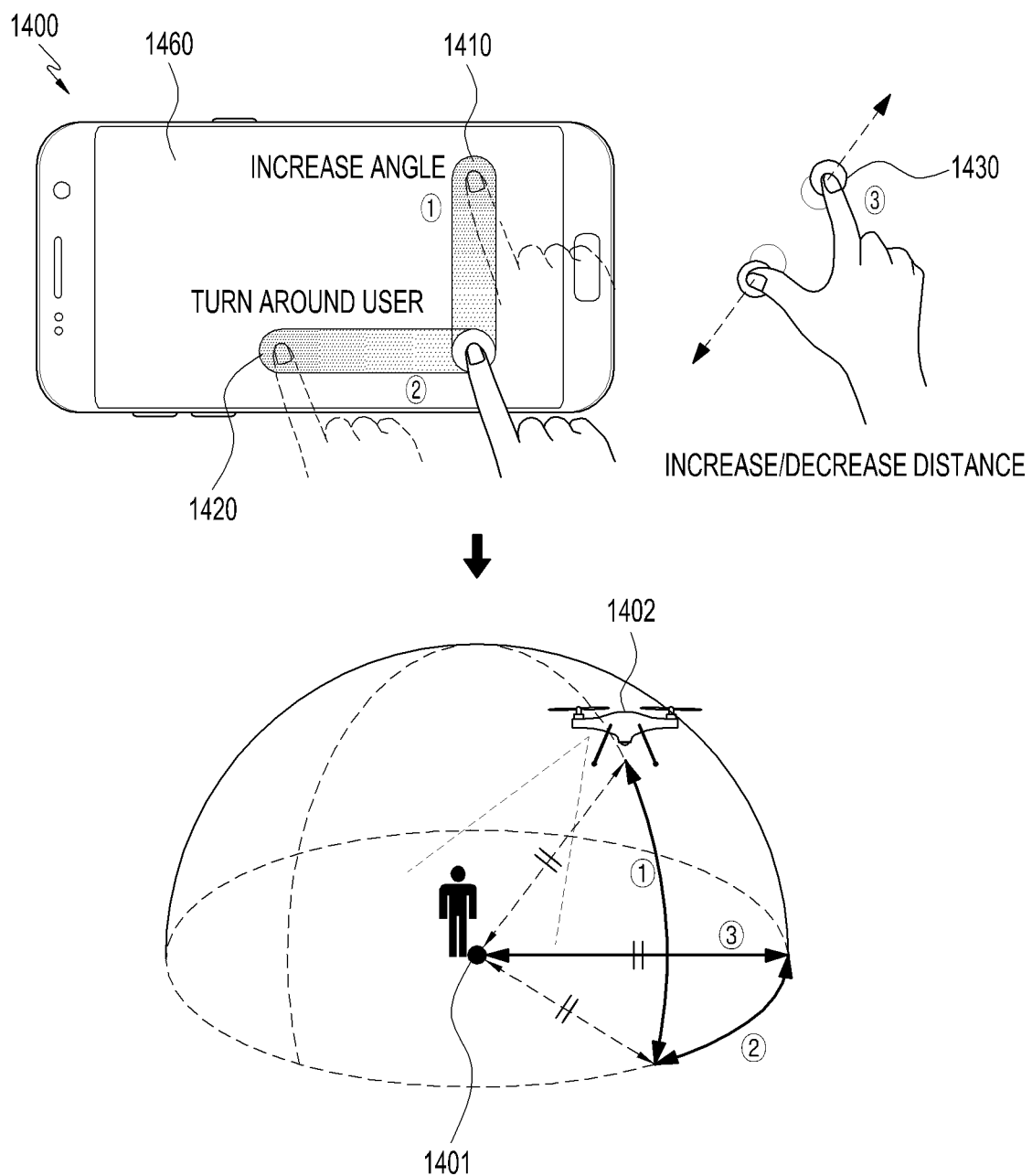
FIG. 14 is a diagram of a user interface for controlling a UAV, according to an embodiment of the present disclosure.

FIG. 14 is a diagram of a user interface for controlling a UAV, according to an embodiment of the present disclosure.

Referring to FIG. 14, an electronic device 1400 may receive, through the user interface 1460, a left turn input, a right turn input, a drift angle increasing direction input, a drift angle decreasing direction input, a retreat input, or an approach input.

Upon receiving an up/down drag input 1410 ($\hat{1},\hat{1}'$) to drag up/down on a user interface 1460 through the user interface 1460, the electronic device 1400 may determine that the up/down drag input 1410 is an up/down input, generate an up/down control signal in response to the reception of the up/down input, and control a UAV 1402 to move up/down while the distance from the original point 1401 is maintained, as the UAV 1402 is viewed from the original point 1401.

Upon receiving a left/right drag input 1420 ($\hat{2},\hat{2}'$) to drag left/right on the user interface 1460 through the user interface 1460, the electronic device 1400 may determine that the left/right drag input 1420 is a left/right input, generate a left/right control signal in response to the reception of the left/right input, and control the UAV 1402 to move left/right while the distance from the original point 1401 is maintained, as the UAV 1402 is viewed from the original point 1401.

Upon receiving a pinch-in/out input 1430 ($\hat{3},\hat{3}'$) on the user interface 1460 through the user interface 1460, the electronic device 1400 may determine that the pinch-in/out input 1430 is a retreat/approach input, generate a retreat/approach control signal in response to the reception of the retreat/approach input, and control the UAV 1402 to retreat/approach the original point 1401 while the angle between the ground and the line connecting the UAV 1402 with the original point 1401 is maintained.

Figure 15:
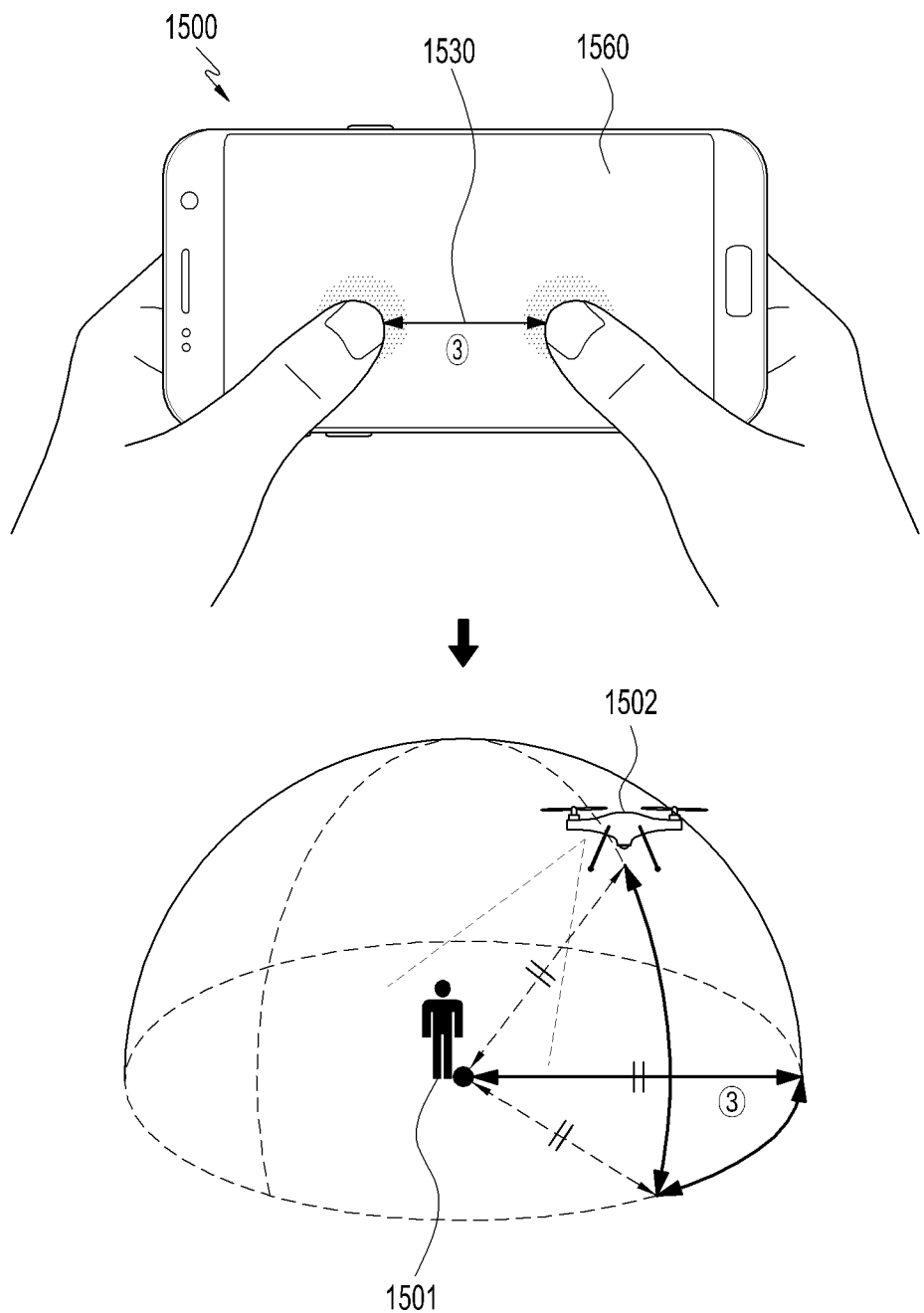
FIG. 15 is a diagram of a user interface for controlling a UAV, according to an embodiment of the present disclosure.

FIG. 15 is a diagram of a user interface for controlling a UAV, according to an embodiment of the present disclosure.

Referring to FIG. 15, upon receiving a pinch-in/out input 1530 ($\hat{3},\hat{3}'$) on the user interface 1560 through the user interface 1560, the electronic device 1500 may determine that the pinch-in/out input 1530 is a retreat/approach input, generate a retreat/approach control signal in response to the reception of the retreat/approach input, and control the UAV 1502 to retreat/approach the original point 1501 while the angle between the ground and the line connecting the UAV 1502 with the original point 1501 is maintained. The UAV 1502 may be controlled by tilting the electronic device 1500 or with angles at which the electronic device 1500 tilts.

Figure 16A:
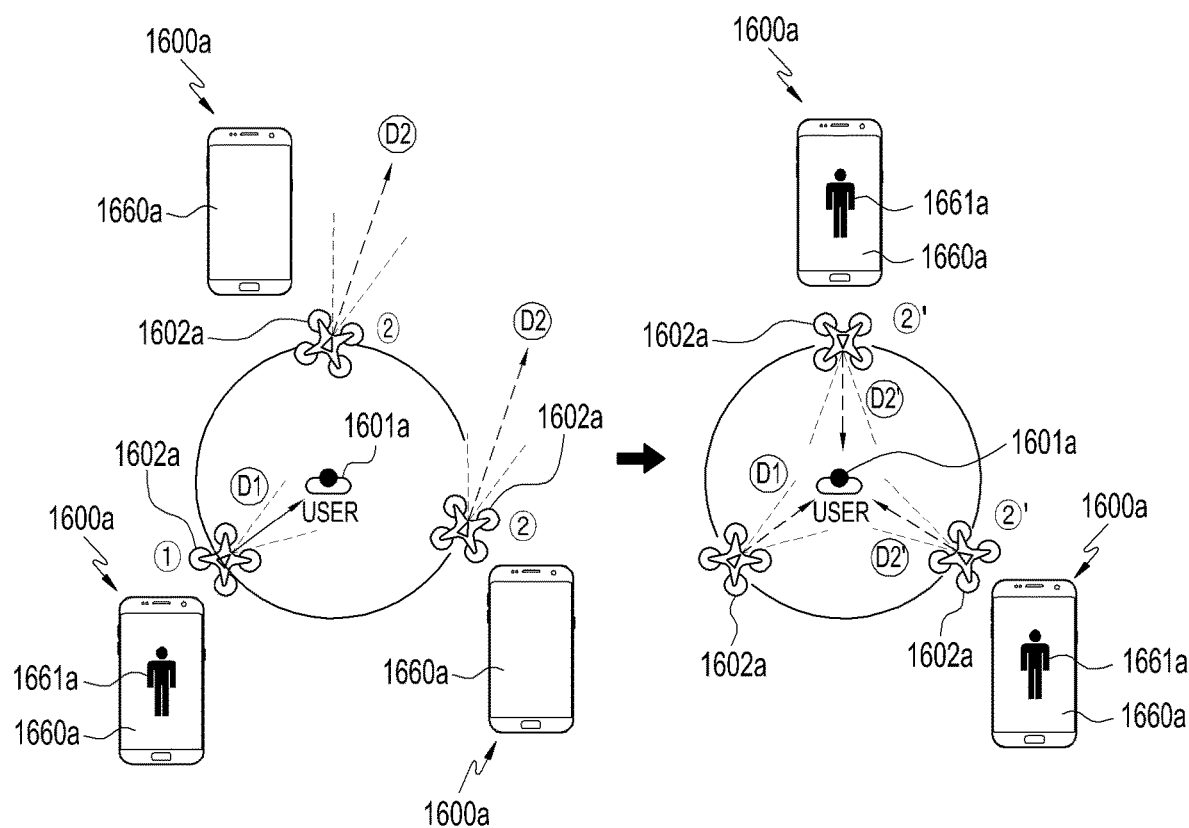
FIGS. 16A and 16B are diagrams of stationary capturing for the original point by a UAV, according to an embodiment of the present disclosure.
Figure 16B:
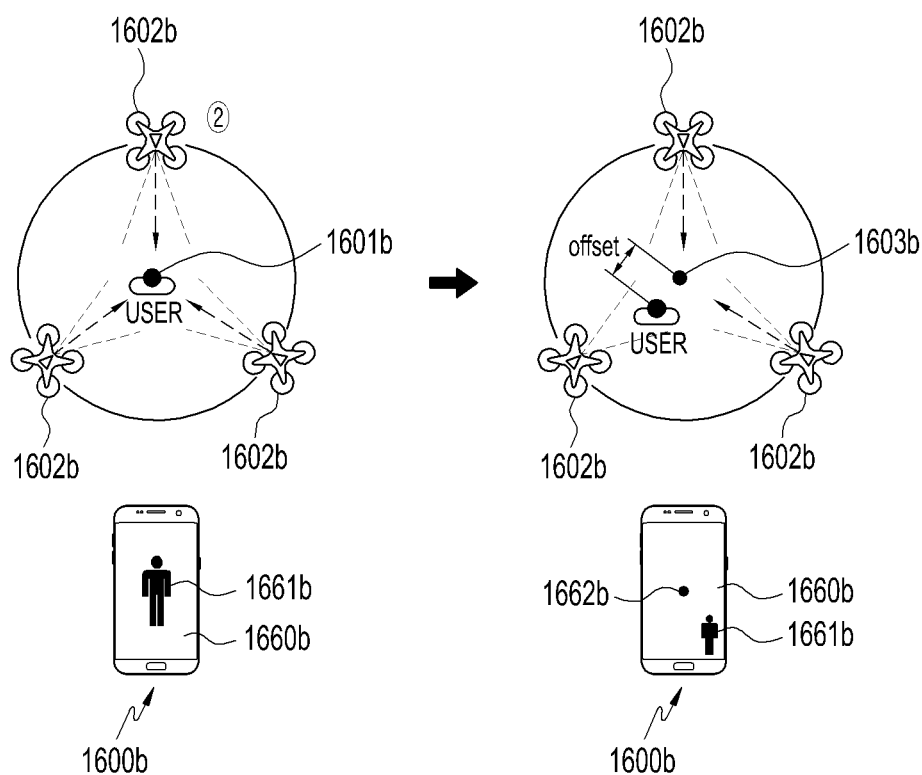

FIGS. 16A and 16B are diagrams of stationary capturing for the original point by a UAV, according to an embodiment of the present disclosure.

For example, when a UAV 1602*a* moves to position $\hat{2}$ while capturing images in the direction D1 of the original point 1601*a* in position $\hat{1}$ as shown on the left-hand part of FIG. 16A, the direction that the camera of the UAV 1602*a* captures images in position $\hat{2}$ may be a direction D2 in which the camera faces the original point 1601*a*, and the original point 1601*a* or a user 1661*a* positioned at the original point may not be shown on the preview screen.

Accordingly, the user may select a fixed capturing mode to center the original point 1601*a* or the user 1661*a* positioned at the original point 1601*a* on the preview image, as will be described in more detail below.

As shown on the right-hand part of FIG. 16A, the electronic device 1600*a* may receive, through the user interface 1660*a*, a selection of a fixed capturing mode to fix the direction of image capturing by the camera of the UAV 1602*a* to the original point 1601*a* where the user is positioned. In the fixed capturing mode, the electronic device 1600*a* may control the UAV 1602*a* to change the azimuthal angle to allow the camera of the UAV 1602*a* to remain in the direction to capture images to the original point 1601*a* where the user (or a fixed object) is positioned. The electronic device 1600*a* may determine that the original point 1601*a* in the fixed capturing mode is the object 1661*a* selected as per a selection input for the object (e.g., the user) 1661*a* displayed on the preview screen captured by the camera of the UAV 1602*a*. The electronic device 1600*a* may transmit, to the UAV 1602*a*, an azimuthal turn control signal to fix the azimuth of the UAV 1602*a* in the direction where the original point 1601*a* is positioned to allow the camera of the UAV 1602*a* to face the original point 1601*a* as set.

In the fixed capturing mode, where the UAV 1602*a* moves to position $\hat{2}'$ while capturing images in the direction D1 of the original point 1601*a* in position $\hat{1}$, the direction of image capturing by the camera of the UAV 1602*a* in position $\hat{2}'$ may be changed to the direction D2' of the original point 1601*a* set in the direction where the original point 1601*a* is viewed from position $\hat{1}$ based on the azimuthal turn control signal transmitted from the electronic device 1600*a*, and the user 1661*a* positioned in the set original point 1601*a* may be displayed on the preview screen.

Referring to FIG. 16B, an electronic device 1600*b* may receive a selection of the original point 1601*b* using a user interface 1660*b*.

As shown on the left-hand part of FIG. 16B, the original point 1601*b* may be set as a user 1661*b* in the fixed capturing mode of the electronic device 1600*b*. Thus, the UAV 1602*b* may keep the azimuth of the UAV 1602*b* in the direction of the user 1661*b* based on an azimuthal turn control signal transmitted from the electronic device 1600*b* to fix the capturing direction of the camera to the direction towards the user 1661*b*.

As shown on the right-hand part of FIG. 16B, the original point 1603*b* in the fixed capturing mode of the electronic device 1600*b* may be set as, not the user 1661*b*, but a third position 1662*b* away from the user 1661*b*. Thus, the UAV 1602*b* may keep the azimuth of the UAV 1602*b* in the direction of the third position 1662*b* based on an azimuthal turn control signal transmitted from the electronic device 1600*b* to fix the capturing direction of the camera to the direction towards, not the user 1661*b*, but the third position 1662*b* which is away from the user 1661*b*.

Figure 17A:
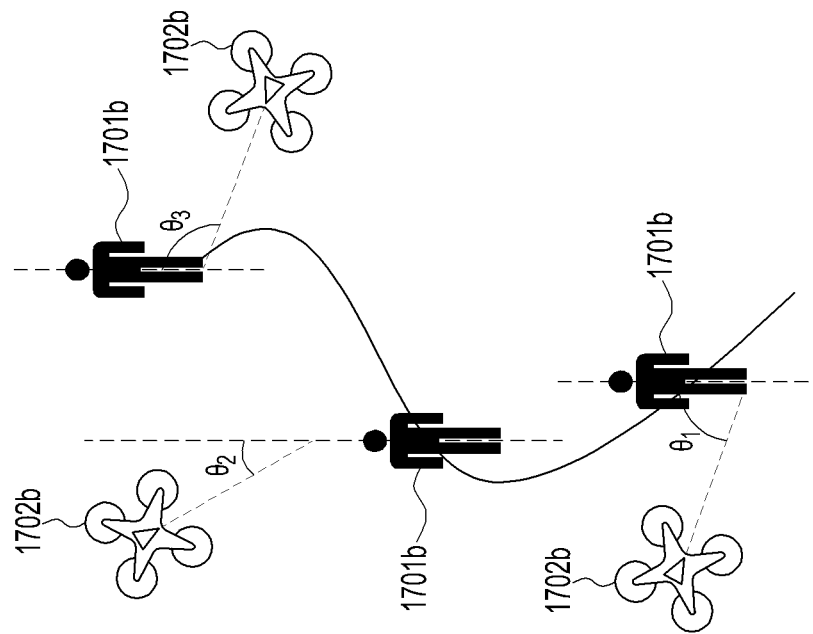
FIGS. 17A and 17B are diagrams of tracing capturing for the original point by a UAV, according to an embodiment of the present disclosure.
Figure 17B:
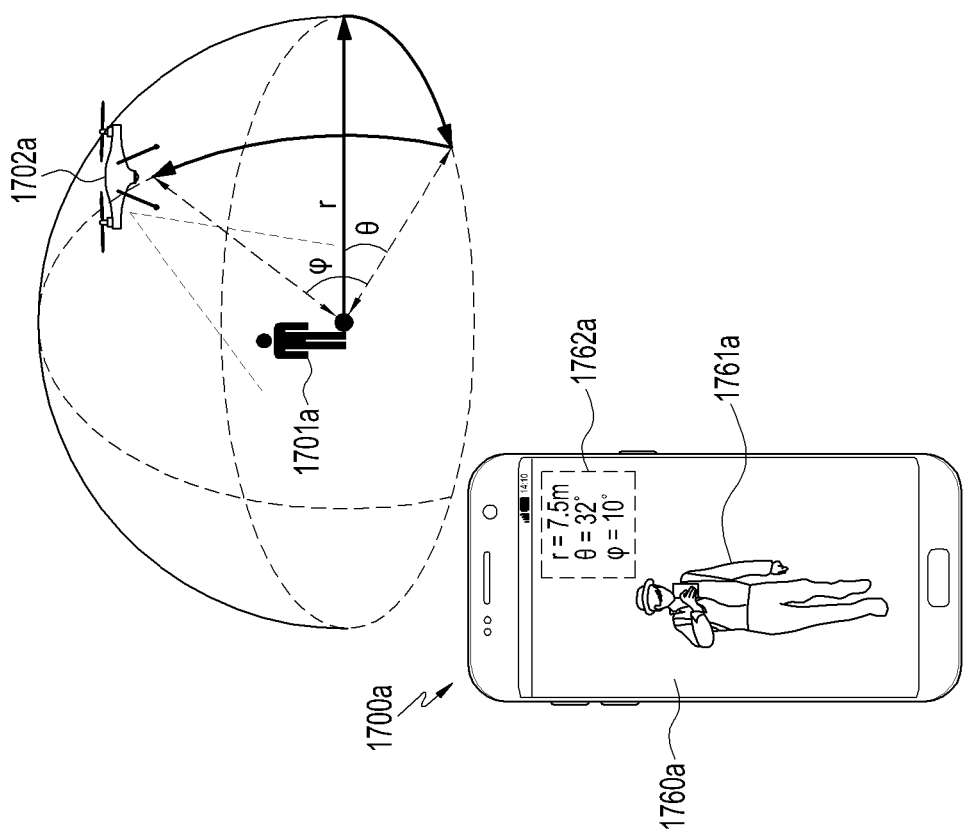

FIGS. 17A and 17B are diagrams of fixed capturing and tracing capturing for the original point by a UAV, according to an embodiment of the present disclosure.

Referring to FIG. 17A after initiating the setting of the original point for an object 1701*a* and a fixed capturing mode for the object 1701*a*, an electronic device 1700*a* may receive a selection input for a tracing capturing mode for the object 1701*a* through a user interface 1760*a*.

In the tracing capturing mode, the electronic device 1700*a* may display information 1762*a* about the distance (e.g., r=7.5 m) between the object 1701*a* and a UAV 1702*a*, the angle (e.g., θ=32 degrees) between the ground and the line connecting the UAV 1702*a* with the object 1701*a*, which has been set as the original point, and the turning angle (e.g., φ=10 degrees) to the object 1701*a*.

The electronic device 1700*a* may transmit, to the UAV 1702*a*, a maintain control signal to maintain the distance (e.g., r=7.5 m) between the set object 1701*a* and the UAV 1702*a*, the angle (e.g., θ=32 degrees) between the ground and the line connecting the UAV 1702*a* with the object 1701*a*, and the turning angle (e.g., φ=10 degrees) to the object 1701*a*.

Referring to FIG. 17B, an electronic device may transmit, to a UAV 1702*b*, a left control signal or right control signal for the UAV 1702*b* while maintaining the distance (e.g., r=7.5 m) between a set object 1701*b* and the UAV 1702*b*, the angle (e.g., θ=32 degrees) between the ground and the line connecting the UAV 1702*b* with the object 1701*b*, and the turning angle (e.g., φ=10 degrees) to the object 1701*b*.

As the object 1701*b* moves, the electronic device may transmit, to the UAV 1702*b*, a right movement control signal to move the UAV 1702*b* to the right while maintaining the distance from the object 1701*b* as viewed from the object 1701*b* in response to a right turn input received through the user interface while maintaining the turning angle (θ1=32 degrees) set for the UAV 1702*b*.

The UAV 1702*b* may change the turning angle (θ1→θ2→θ3) in response to the reception of a right movement control signal to move the UAV 1702*b* to the right while moving in the same direction as the object 1701*b* moves so as to maintain the distance (e.g., r=7.5 m) between the object 1701*b* and the UAV 1702*b*, the angle (e.g., θ=32 degrees) between the ground and the line connecting the object 1701*b* and the UAV 1702*b*, and the turning angle (e.g., φ=10 degrees) to the object 1701*b* which are set as per the tracing capturing mode. For example, the distance or angle of the UAV 1702*b* may also be varied.

Figure 18:
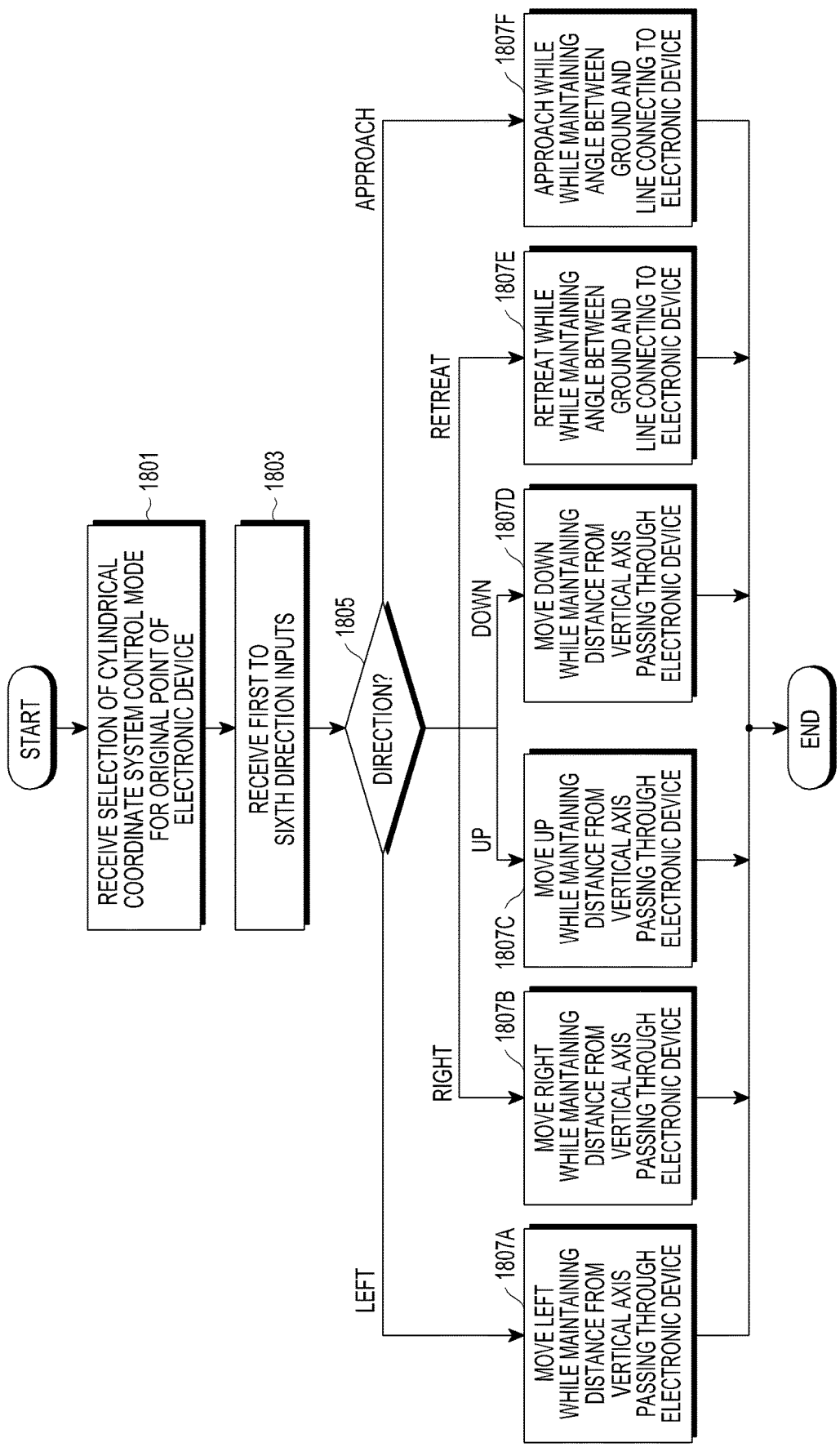
FIG. 18 is a flowchart of a method for controlling a UAV in a cylindrical coordinate system control mode, according to an embodiment of the present disclosure.

FIG. 18 is a flowchart of a method for controlling a UAV in a cylindrical coordinate system control mode, according to an embodiment of the present disclosure.

Referring to FIG. 18, an electronic device 101 may receive a selection of a cylindrical coordinate system control mode in which the electronic device 101 has been set to the original point in step 1801.

The electronic device 101 may receive an input to select, not a spherical coordinate system control mode, but the cylindrical coordinate system control mode, using a user interface.

In step 1803, the electronic device 101 may receive first to sixth direction inputs through the user interface.

The electronic device 101 may determine the direction of the input in step 1805.

In step 1807A, when the entered input is an input to horizontally move to the left, the electronic device 101 may transmit, to a UAV, a left control signal to move the UAV to the left as viewed from the electronic device 101 while the distance between the UAV and the vertical axis (e.g., the z axis) passing through the electronic device 101 is maintained.

In step 1807B, when the entered input is an input to horizontally move to the right, the electronic device 101 may transmit, to the UAV, a right control signal to move the UAV to the right as viewed from the electronic device 101 while the distance between the UAV and the vertical axis (e.g., the z axis) passing through the electronic device 101 is maintained.

In step 1807C, when the entered input is an input to vertically move upwards, the electronic device 101 may transmit, to the UAV, an up control signal to move the UAV upwards as viewed from the electronic device 101 while the distance between the UAV and the vertical axis (e.g., the z axis) passing through the electronic device 101 is maintained.

In step 1807C, when the entered input is an input to vertically move downwards, the electronic device 101 may transmit, to the UAV, a down control signal to move the UAV downwards as viewed from the electronic device 101 while the distance between the UAV and the vertical axis (e.g., the z axis) passing through the electronic device 101 is maintained.

In step 1807E, when the entered input is an input to retreat, the electronic device 101 may transmit, to the UAV, a retreat control signal to retreat as viewed from the electronic device 101 while the angle between the ground and the line connecting the UAV with the original point is maintained.

In step 1807F, when the entered input is an input to approach, the electronic device 101 may transmit, to the UAV, an approach control signal to approach as viewed from the electronic device 101 while the angle between the ground and the line connecting the UAV with the original point is maintained.

Figure 19:
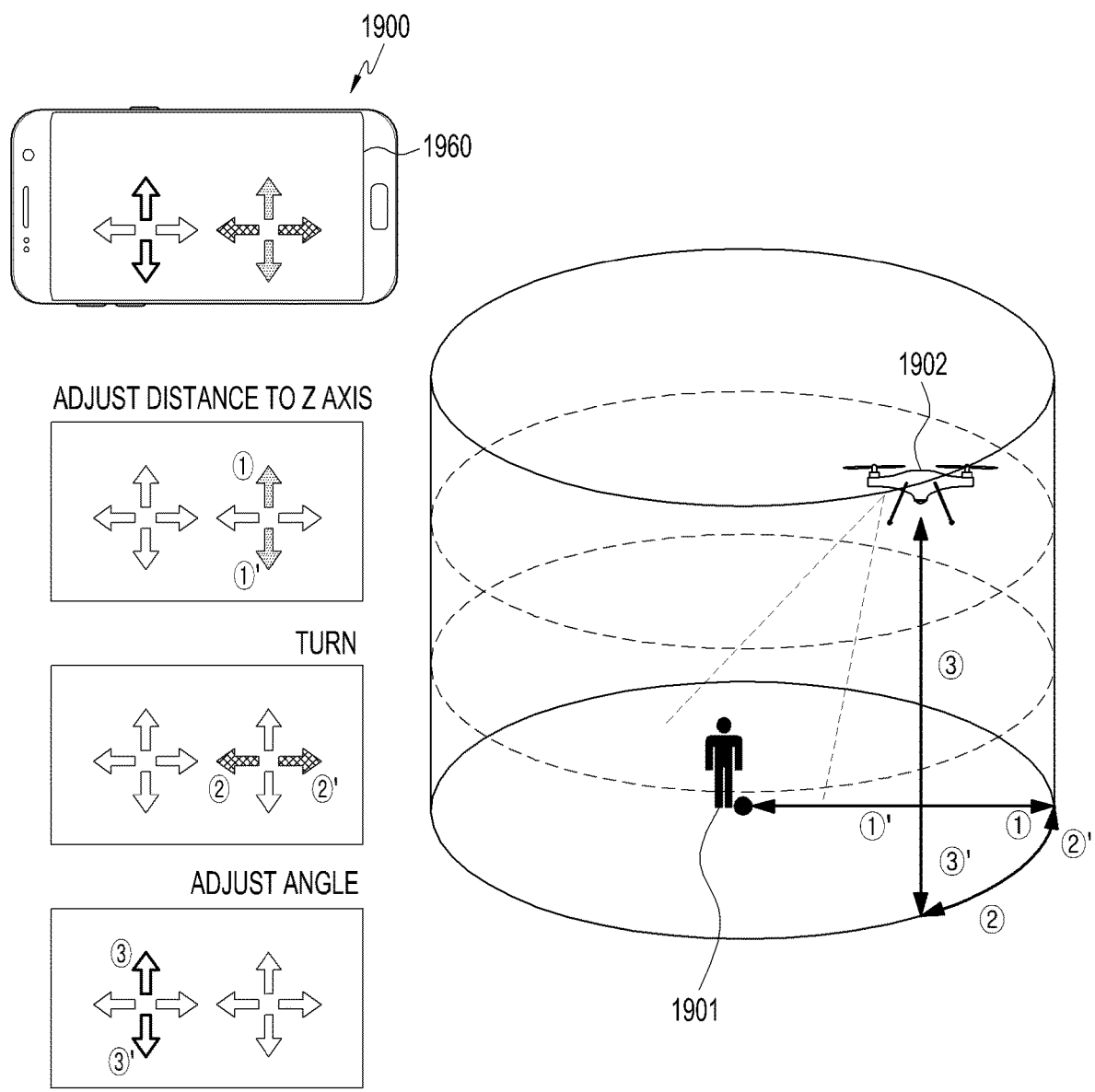
FIG. 19 is a diagram of a method for controlling a UAV in a cylindrical coordinate system control mode, according to an embodiment of the present disclosure.

FIG. 19 is a diagram of a method for controlling a UAV in a cylindrical coordinate system control mode, according to an embodiment of the present disclosure.

Referring to FIG. 19, when using a second control mode among all scenarios encompassing first to fourth control modes, an electronic device 1900 may receive, through a user interface 1960, a retreat/approach input ($\hat{1},\hat{1}'$) to adjust the distance between a UAV 1902 and the z axis passing through the original point 1901, a left/right input ($\hat{2},\hat{2}'$) to adjust the turning angle around the original point 1901, and an up/down input ($\hat{3},\hat{3}'$) to adjust the height from the ground passing through the original point 1901.

Figure 20:
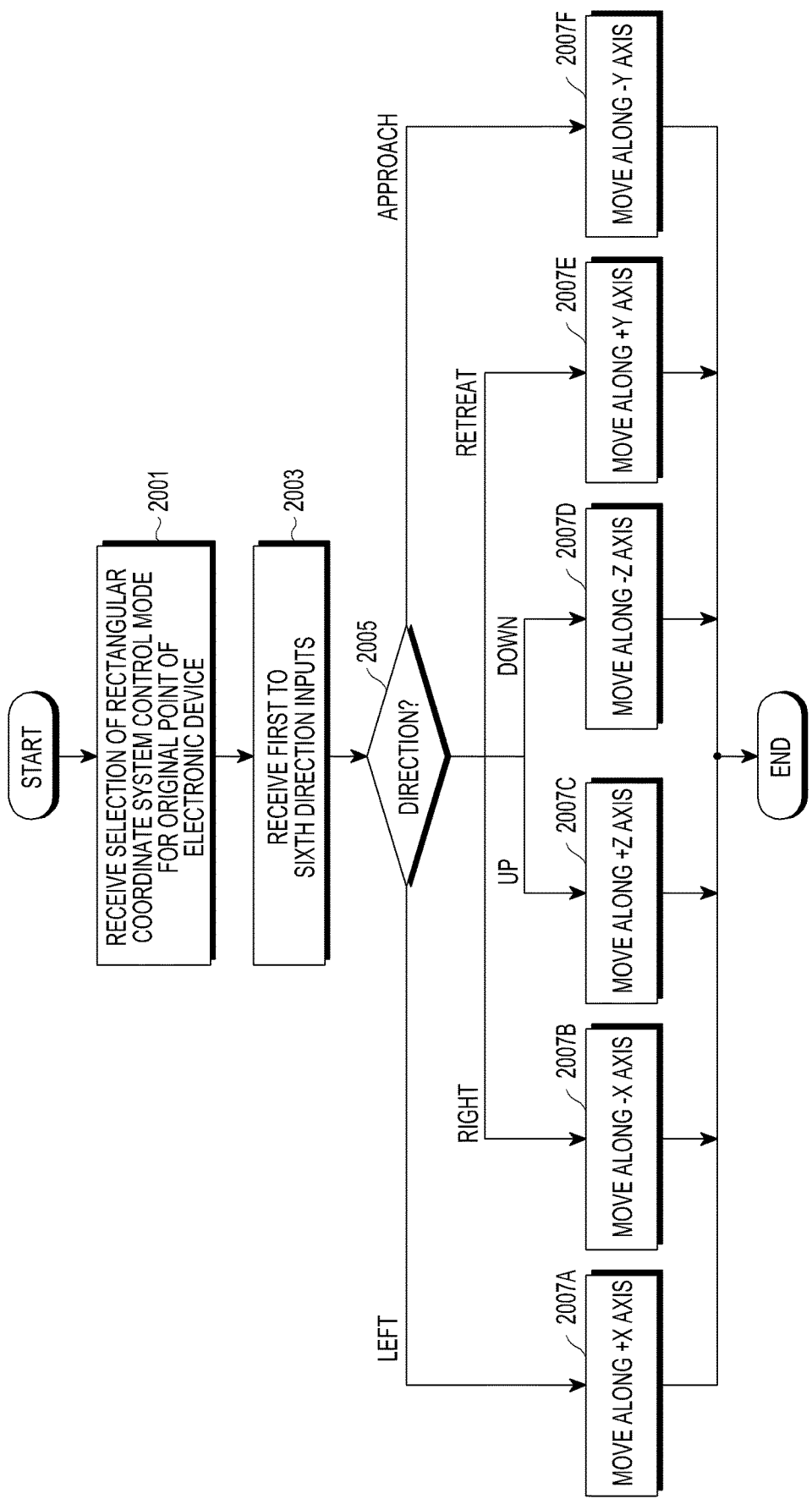
FIG. 20 is a flowchart of a method for controlling a UAV in a rectangular coordinate system control mode, according to an embodiment of the present disclosure.

FIG. 20 is a flowchart of a method for controlling a UAV in a rectangular coordinate system control mode, according to an embodiment of the present disclosure.

Referring to FIG. 20, an electronic device 101 may receive a selection of a rectangular coordinate system, at step 2001, control mode in which the electronic device 101 has been set to the original point using a user interface.

In step 2003, the electronic device 101 may receive first to sixth direction inputs through the user interface.

The electronic device 101 may determine the direction of a received input in step 2005.

According to an embodiment of the present disclosure, in step 2007A, when the entered input is a move-left input, the electronic device 101 may transmit an x-axis positive direction control signal to move a UAV in a preset positive direction on the x axis in response to the reception of the move-left input.

In step 2007B, when the entered input is a move-right input, the electronic device 101 may transmit an x-axis negative direction control signal to move the UAV in a preset negative direction on the x axis in response to the reception of the move-right input.

In step 2007C, when the entered input is a move-up input, the electronic device 101 may transmit a z-axis positive direction control signal to move the UAV in a preset positive direction on the z axis in response to the reception of the move-up input.

In step 2007D, when the entered input is a move-down input, the electronic device 101 may transmit a z-axis negative direction control signal to move the UAV in a preset negative direction on the z axis in response to the reception of the move-down input.

In step 2007E, when the entered input is a retreat input, the electronic device 101 may transmit a y-axis positive direction control signal to move the UAV in a preset positive direction on the y axis in response to the reception of the retreat input.

In step 2007F, when the entered input is an approach input, the electronic device 101 may transmit a y-axis negative direction control signal to move the UAV in a preset negative direction on the y axis in response to the reception of the approach input.

Figure 21:
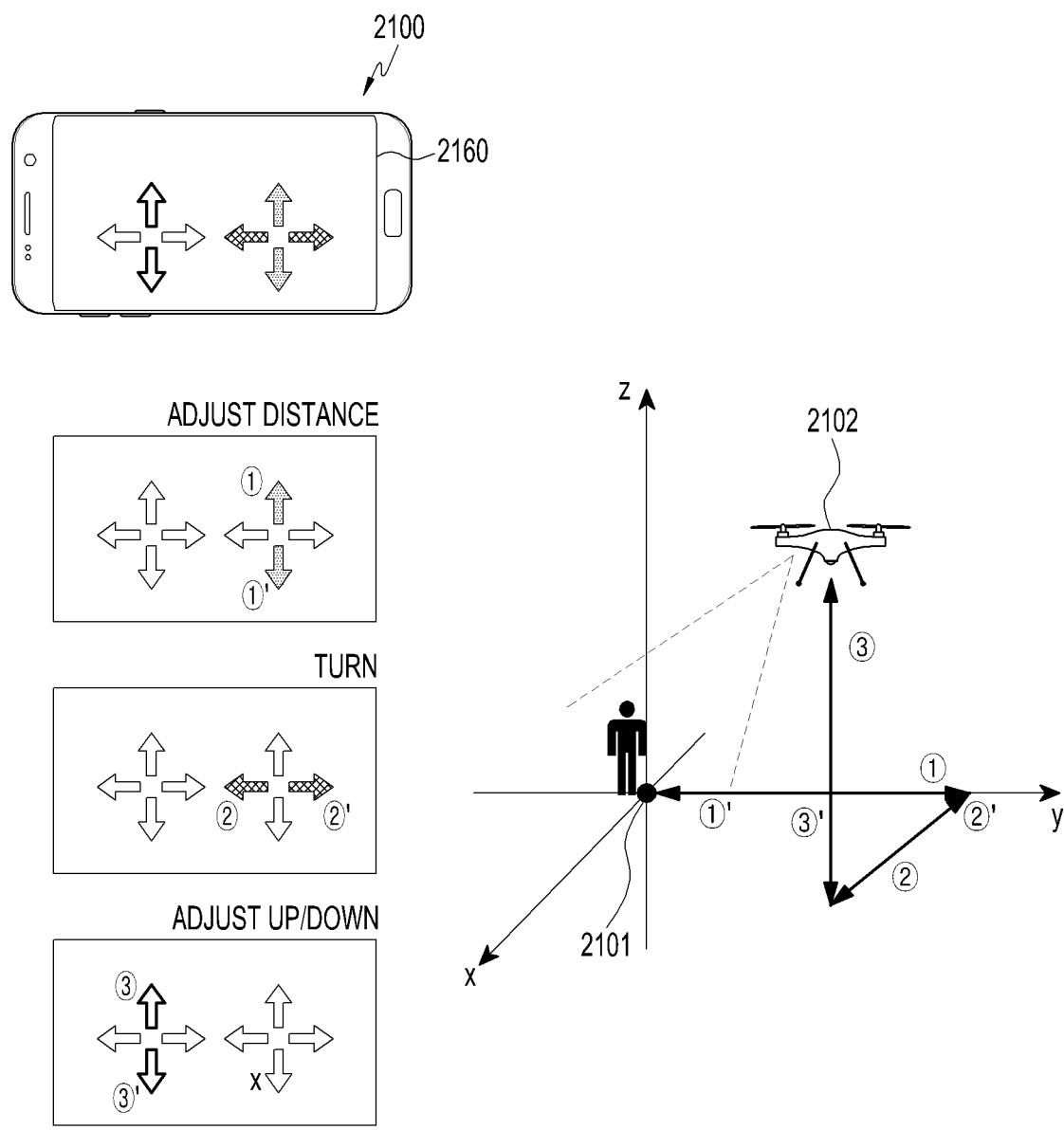
FIG. 21 is a diagram of a method for controlling a UAV in a rectangular coordinate system control mode, according to an embodiment of the present disclosure.

FIG. 21 is a diagram of a method for controlling a UAV in a rectangular coordinate system control mode, according to an embodiment of the present disclosure.

Referring to FIG. 21, an electronic device 2100 may receive, using a user interface 2160, an x-axis positive/negative move input $(\hat{1},\hat{1}')$ to move a UAV 2102 in a positive or negative direction on the x axis with respect to a preset original point 2101, a y-axis positive/negative direction move input $(\hat{2},\hat{2}')$ to move the UAV 2102 in a positive or negative direction on the y axis, and a z-axis positive/negative direction move input $(\hat{3},\hat{3}')$ to move the UAV 2102 in a positive or negative direction on the z axis.

According to an embodiment of the present disclosure, an electronic device includes a user interface configured to receive a first direction input, a second direction input, a third direction input, and a fourth direction input, the first direction input including an input to horizontally move in a left direction, the second direction input including an input to horizontally move in a right direction, the third direction input including an input to vertically move in an upper direction, and the fourth direction input including an input to vertically move in a lower direction, a wireless communication circuit configured to establish a wireless communication channel with a unmanned aerial vehicle (UAV) including a camera, a processor electrically connected with the user interface and the wireless communication circuit, and a memory electrically connected with the processor, wherein the memory stores instructions executed to enable the processor to receive a user input to select a first mode through the user interface, during the first mode, transmit, through the wireless communication channel, a first control signal to move the UAV in the left direction as viewed from the electronic device while a distance between the UAV and the electronic device is maintained in response to receiving the first direction input through the user interface, transmit, through the wireless communication channel, a second control signal to move the UAV in the right direction as viewed from the electronic device while the distance between the UAV and the electronic device is maintained in response to receiving the second direction input through the user interface, transmit, through the wireless communication channel, a third control signal to move the UAV in the upper direction as viewed from the electronic device while the distance between the UAV and the electronic device is maintained in response to receiving the third direction input through the user interface, and transmit, through the wireless communication channel, a fourth control signal to move the UAV in the lower direction as viewed from the electronic device while the distance between the UAV and the electronic device is maintained in response to receiving the fourth direction input through the user interface.

The user interface may include a touchscreen display.

The user interface may include at least one of a plurality of direction handles, a plurality of direction sticks, and a plurality of direction buttons configured to receive the first to fourth direction inputs.

The instructions may enable the processor to transmit a control signal through the wireless communication channel. The control signal may be configured to enable the camera of the UAV to trace or face an object or the electronic device during the first mode.

The instructions may enable the processor to receive, through the user interface, a user input to select a second mode, and during the second mode, transmit, through the wireless communication channel, the first control signal to move the UAV in the left direction as viewed from the electronic device while the distance between the UAV and the electronic device is maintained in response to receiving the first direction input through the user interface, transmit, through the wireless communication channel, the second control signal to move the UAV in the right direction as viewed from the electronic device while the distance between the UAV and the electronic device is maintained in response to receiving the second direction input through the user interface, transmit, through the wireless communication channel, a fifth control signal to vertically move the UAV in the upper direction as viewed from the electronic device in response to receiving the third direction input through the user interface, and transmit, through the wireless communication channel, a sixth control signal to vertically move the UAV in the lower direction as viewed from the electronic device in response to receiving the fourth direction input through the user interface.

The instructions may enable the processor to transmit a control signal through the wireless communication channel. The control signal may be configured to enable the camera of the UAV to trace or face an object or the electronic device during the second mode.

The instructions may enable the processor to receive, through the user interface, a user input to select a third mode, and during the third mode, transmit, through the wireless communication channel, a seventh control signal to horizontally move the UAV in the left direction as viewed from the electronic device in response to receiving the first direction input through the user interface, transmit, through the wireless communication channel, an eighth control signal to horizontally move the UAV in the right direction as viewed from the electronic device in response to receiving the second direction input through the user interface, transmit, through the wireless communication channel, a fifth control signal to vertically move the UAV in the upper direction as viewed from the electronic device in response to receiving the third direction input through the user interface, and transmit, through the wireless communication channel, a sixth control signal to vertically move the UAV in the lower direction as viewed from the electronic device in response to receiving the fourth direction input through the user interface.

The user interface may be configured to receive a retreat input or an approach input. The instructions may enable the processor to transmit, through the wireless communication channel, a ninth control signal to move the UAV away from the electronic device as viewed from the electronic device while an angle between a ground and a line connecting the UAV with an original point is maintained in response to receiving the retreat input through the user interface, and transmit, through the wireless communication channel, a tenth control signal to move the UAV close to the electronic device as viewed from the electronic device while the angle between the ground and the line connecting the UAV with the original point is maintained in response to receiving the approach input through the user interface.

The first control signal may include a first movement control signal to move the UAV in a first straight line direction set in a 3D space and a second movement control signal to move the UAV in a second straight line direction perpendicular to the first straight line direction.

The second control signal may include a third movement control signal to move the UAV in a first straight line direction set in a 3D space and a fourth movement control signal to move the UAV in a second straight line direction perpendicular to the first straight line direction.

The third control signal may include a first movement control signal to move the UAV in a first straight line direction set in a 3D space, a fourth movement control signal to move the UAV in a second straight line direction perpendicular to the first straight line direction, and a fifth movement control signal to move the UAV in a third straight line direction perpendicular to the first straight line direction and the second straight line direction.

The fourth control signal may include a third movement control signal to move the UAV in a first straight line direction set in a 3D space, a second movement control signal to move the UAV in a second straight line direction perpendicular to the first straight line direction, and a sixth movement control signal to move the UAV in a third straight line direction perpendicular to the first straight line direction and the second straight line direction.

The ninth control signal may include a third movement control signal to move the UAV in a first straight line direction set in a 3D space, a second movement control signal to move the UAV in a second straight line direction perpendicular to the first straight line direction, and a fifth movement control signal to move the UAV in a third straight line direction perpendicular to the first straight line direction and the second straight line direction.

The tenth control signal may include a first movement control signal to move the UAV in a first straight line direction set in a 3D space, a fourth movement control signal to move the UAV in a second straight line direction perpendicular to the first straight line direction, and a sixth movement control signal to move the UAV in a third straight line direction perpendicular to the first straight line direction and the second straight line direction.

The first control signal may include a seventh movement control signal to move the UAV in a first circumference direction set with respect to a set original point.

The second control signal may include an eighth movement control signal to move the UAV in a first circumference direction set with respect to a set original point.

The third control signal may include a fifth movement control signal to move the UAV in a third straight line direction set with respect to a set original point and a ninth movement control signal to move the UAV in a fourth straight line direction perpendicular to the third straight line direction.

The fourth control signal may include a sixth movement control signal to move the UAV in a set third straight line direction and a tenth movement control signal to move the UAV in a set fourth straight line direction perpendicular to the third straight line direction.

The ninth control signal may include a fifth movement control signal to move the UAV in a third straight line direction set with respect to a set original point and a tenth movement control signal to move the UAV in a set fourth straight line direction perpendicular to the third straight line direction.

The tenth control signal may include a sixth movement control signal to move the UAV in an opposite direction of a set third straight line direction and a ninth movement control signal to move the UAV in a set fourth straight line direction perpendicular to the third straight line direction.

The instructions may enable the processor to receive, through the user interface, a user input to select a fixed capturing mode for a set original point. The first control signal may include a turn control signal to turn the UAV in a set circumference direction so that a direction of image capturing by the camera is directed to the original point when the UAV is moved during the fixed capturing mode.

The instructions may enable the processor to receive a setting input for the original point and set the original point based on the setting input.

The instructions may enable the processor to display a distance between the UAV and the electronic device, an angle among the UAV, an original point, and the electronic device, and a turning angle of the UAV.

According to an embodiment of the present disclosure, an electronic device includes a communication circuit, a user interface, and a processor receiving a first input using the user interface, generating a first control signal to move a UAV in a direction corresponding to the first input while a distance between the UAV and the electronic device is maintained according to the first input, and transmitting the first control signal to the UAV using the communication circuit.

The processor may receive a second input using the user interface, generate a second control signal to move the UAV in a direction corresponding to the second input while an angle between a ground and a line connecting the UAV with the electronic device is maintained according to the second input, and transmit the second control signal to the UAV using the communication circuit.

According to an embodiment of the present disclosure, an electronic device includes a communication circuit, a user interface, and a processor receiving a first input based on a first coordinate system using the user interface, generating a second coordinate system, first control signal to move a UAV with a distance between the UAV and the electronic device maintained, using the first input in response to the first input, and transmitting the first control signal to the UAV.

The processor may control the UAV to maintain an angle between a ground and a line connecting the UAV with the electronic device.

In accordance with aspects of the present disclosure, an electronic device may provide a user with a more intuitive interface to control a UAV.

The electronic device may receive spherical coordinate system inputs for the UAV, allowing the user to control the UAV with the distance between the user, or electronic device, and the UAV or the composition of the UAV camera fixed.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device, comprising:
   a touch screen;
   a wireless communication circuit configured to establish a wireless communication channel with an unmanned aerial vehicle (UAV) including a camera;

a memory; and a processor electrically connected with the memory, the touch screen, and the wireless communication circuit, wherein the memory stores instructions, and the processor is configured to execute the instructions to cause the electronic device to perform operations comprising:

displaying a user interface to receive at least one direction input regarding a movement of the UAV through the touch screen;

receiving a first user input to select a first mode through the touch screen;

receiving a second user input to select an object in an image displayed on the touch screen of the electronic device through the touch screen, wherein the image is captured by the camera of the UAV and the image is received from the UAV;

in response to receiving the second user input to select the object in the image, transmitting, through the wireless communication circuit, a signal to change a posture of the camera of the UAV in a state where a position of the UAV is maintained such that the object is positioned at a center of the image displayed on the touch screen of the electronic device;

during the first mode in which the posture of the camera of the UAV is changed such that the object, which is selected in the image by the second user input, is positioned at the center of the image, transmit, through the wireless communication circuit, at least one control signal to move the UAV in at least one direction corresponding to the at least one direction input while a distance between the UAV and the object is maintained in response to receiving the at least one direction input.

2. The electronic device of claim 1, wherein the at least one direction input comprises a first direction input, a second direction input, a third direction input, and a fourth direction input, and the first direction input is used to move the UAV, horizontally in a left direction, the second direction input is used to move the UAV horizontally in a right direction, the third direction input is used to move the UAV vertically in an upper direction, and the fourth direction input is used to move the UAV vertically in a lower direction, and wherein the user interface includes at least one of a plurality of direction handles, a plurality of direction sticks, and a plurality of direction buttons configured to receive the first to fourth direction inputs.

3. The electronic device of claim 2, wherein the operations further comprise receiving a user input to select a second mode, and during the second mode, transmitting a first control signal to move the UAV in the left direction while a distance between the UAV and the electronic device is maintained in response to receiving the first direction input, transmitting a second control signal to move the UAV in the right direction while the distance between the UAV and the electronic device is maintained in response to receiving the second direction input, transmitting a fifth control signal to move the UAV vertically in the upper direction in response to receiving the third direction input, and transmitting a sixth control signal to move the UAV vertically in the lower direction in response to receiving the fourth direction input.

4. The electronic device of claim 2, wherein the operations further comprise receiving a user input to select a third mode, and during the third mode, transmitting a seventh control signal to move the UAV horizontally in the left direction in response to receiving the first direction input, transmitting an eighth control signal to move the UAV horizontally in the right direction in response to receiving the second direction input, transmitting a fifth control signal to move the UAV vertically in the upper direction in response to receiving the third direction input, and transmitting a sixth control signal to move the UAV vertically in the lower direction in response to receiving the fourth direction input.

5. The electronic device of claim 2, wherein the user interface is further configured to receive a retreat input or an approach input, and wherein the operations further comprise transmitting a ninth control signal to move the UAV away from the electronic device while an angle between a ground and a line connecting the UAV with an original point is maintained in response to receiving the retreat input, and transmitting a tenth control signal to move the UAV close to the electronic device while the angle between the ground and the line connecting the UAV with the original point is maintained in response to receiving the approach input.

6. The electronic device of claim 2, wherein the operations further comprise during the first mode in which the posture of the camera of the UAV is changed such that the object, which is selected in the image by the second user input, is positioned at the center of the image:

transmitting a first control signal to move the UAV in the left direction while the distance between the UAV and the object is maintained in response to receiving the first direction input, transmitting a second control signal to move the UAV in the right direction while the distance between the UAV and the object is maintained in response to receiving the second direction input, transmitting a third control signal to move the UAV in the upper direction while the distance between the UAV and the object is maintained in response to receiving the third direction input, and transmitting a fourth control signal to move the UAV in the lower direction while the distance between the UAV and the object is maintained in response to receiving the fourth direction input.

7. The electronic device of claim 1, wherein the operations further comprise transmitting a control signal to enable the camera of the UAV to trace or face a first object or the electronic device during the first mode.

8. The electronic device of claim 1, wherein the operations further comprise transmitting a first control signal to the UAV, and wherein the first control signal includes a first movement control signal to move the UAV in a first straight line direction set in a three-dimensional (3D) space and a second movement control signal to move the UAV in a second straight line direction perpendicular to the first straight line direction.

9. The electronic device of claim 1, wherein the operations further comprise transmitting a second control signal to the UAV, and wherein the second control signal includes a third movement control signal to move the UAV in a first straight line direction set in a 3D space and a fourth movement control signal to move the UAV in a second straight line direction perpendicular to the first straight line direction.

10. The electronic device of claim 1, wherein the operations further comprise transmitting a third control signal to the UAV, and wherein the third control signal includes a first movement control signal to move the UAV in a first straight line direction set in a 3D space, a fourth movement control signal to move the UAV in a second straight line direction perpendicular to the first straight line direction, and a fifth movement control signal to move the UAV in a third straight line direction perpendicular to the first straight line direction and the second straight line direction.

11. The electronic device of claim 1, wherein the operations further comprise transmitting a fourth control signal to the UAV, and
wherein the fourth control signal includes a third movement control signal to move the UAV in a first straight line direction set in a 3D space, a second movement control signal to move the UAV in a second straight line direction perpendicular to the first straight line direction, and a sixth movement control signal to move the UAV in a third straight line direction perpendicular to the first straight line direction and the second straight line direction.

12. The electronic device of claim 1, wherein the operations further comprise transmitting a first control signal to the UAV, and
wherein the first control signal includes a seventh movement control signal to move the UAV in a first circumference direction set with respect to a set original point.

13. The electronic device of claim 1, wherein the operations further comprise transmitting a second control signal to the UAV, and
wherein the second control signal includes an eighth movement control signal to move the UAV in a first circumference direction set with respect to a set original point.

14. The electronic device of claim 1, wherein the operations further comprise transmitting a third control signal to the UAV, and
wherein the third control signal includes a fifth movement control signal to move the UAV in a third straight line direction set with respect to a set original point and a ninth movement control signal to move the UAV in a fourth straight line direction perpendicular to the third straight line direction.

15. The electronic device of claim 1, wherein the operations further comprise transmitting a fourth control signal to the UAV, and
wherein the fourth control signal includes a sixth movement control signal to move the UAV in a set third straight line direction and a tenth movement control signal to move the UAV in a set fourth straight line direction perpendicular to the third straight line direction.

16. The electronic device of claim 1, wherein the operations further comprise receiving a user input to select a fixed capturing mode for a set original point, and wherein a first control signal includes a turn control signal to turn the UAV in a set circumference direction so that a capturing direction of the camera is directed to the original point when the UAV is moved during the fixed capturing mode.

17. The electronic device of claim 1, wherein the operations further comprise displaying the distance between the UAV and the object, an angle among the UAV, an original point, and the electronic device, and a turning angle of the UAV.

* * * * *